(12) United States Patent
Dobbins et al.

(10) Patent No.: US 7,370,364 B2
(45) Date of Patent: May 6, 2008

(54) MANAGING CONTENT RESOURCES

(75) Inventors: Kurt A. Dobbins, Bedford, NH (US); Jason P. Poirier, Bedford, NH (US); Wouter Johan Weiss, Chelmsford, MA (US); Andre C. Boutin, Manchester, NH (US); Justin William Haddad, Merrimack, NH (US); Stephen G. Delahunty, Bedford, NH (US); David L. Cullerot, Nasha, NH (US); Mark Thomas Sexton, Merrimack, NH (US); Adam Michael Lederman, Nashua, NH (US); Christopher Lawrence Cheetham, Auburn, NH (US); David Ruffen, Salem, NH (US)

(73) Assignee: Ellacoya Networks, Inc., Merrimack, NH (US)

( * ) Notice: Subject to any disclaimer, the term of this patent is extended or adjusted under 35 U.S.C. 154(b) by 621 days.

(21) Appl. No.: 09/918,972

(22) Filed: Jul. 31, 2001

(65) Prior Publication Data

US 2002/0066033 A1  May 30, 2002

Related U.S. Application Data

(60) Provisional application No. 60/222,038, filed on Jul. 31, 2000.

(51) Int. Cl.
*H04L 9/32* (2006.01)
*H04N 7/16* (2006.01)
*G06F 7/04* (2006.01)

(52) U.S. Cl. ................... 726/28; 726/4; 726/29
(58) Field of Classification Search ............. 726/4, 726/26, 27, 28, 29; 715/513; 719/311
See application file for complete search history.

(56) References Cited

U.S. PATENT DOCUMENTS

| | | | |
|---|---|---|---|
| 6,327,628 B1 * | 12/2001 | Anuff et al. | 719/311 |
| 6,381,579 B1 * | 4/2002 | Gervais et al. | 705/8 |
| 6,697,865 B1 * | 2/2004 | Howard et al. | 709/229 |
| 6,714,987 B1 * | 3/2004 | Amin et al. | 709/249 |
| 6,718,328 B1 * | 4/2004 | Norris | 707/9 |
| 6,725,425 B1 * | 4/2004 | Rajan et al. | 715/513 |
| 7,124,203 B2 * | 10/2006 | Joshi et al. | 709/248 |
| 7,243,136 B2 * | 7/2007 | Huston et al. | 709/217 |

* cited by examiner

*Primary Examiner*—Emmanuel Moise
*Assistant Examiner*—Zachary A. Davis
(74) *Attorney, Agent, or Firm*—Irah H. Donner; Wilmer Cutler Pickering Hale and Dorr LLP

(57) ABSTRACT

Content resources are managed. A request is received from a user for access to a source of content resources. It is determined that the user is authorized for access to the source. A portal Web page is generated based on a set of content element data applicable to the subscriber. The portal Web page is returned to the user. A system for use in managing content resources has a switch for receiving requests from Web browsers, a content resource management engine in communication with the switch, and a billing system in communication with the content resource management engine.

20 Claims, 14 Drawing Sheets

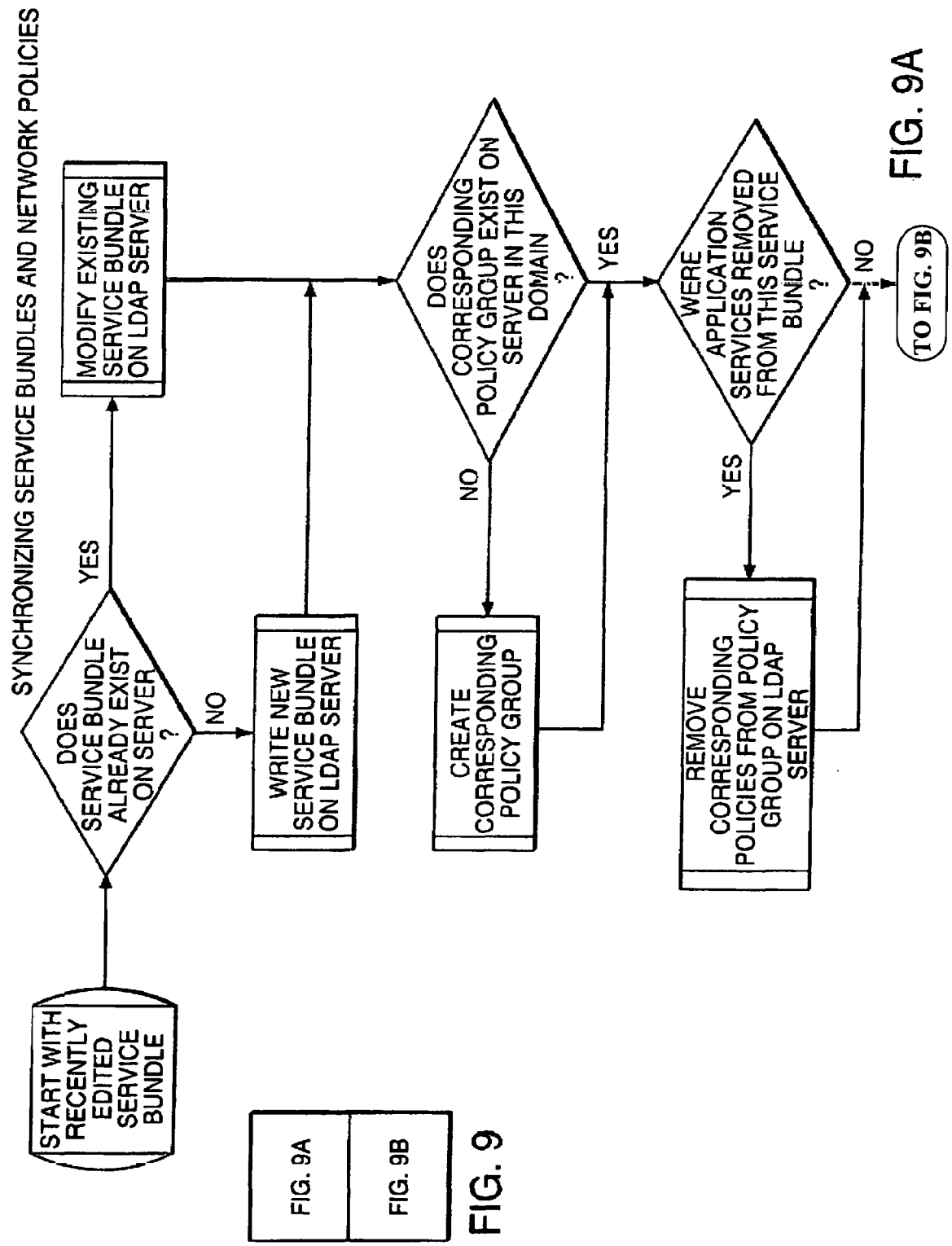

| DIRECTORY NAME | SUB-DIRECTORY NAME | FUNCTION |
|---|---|---|
| APPLICATION SERVICES | | CONTAINS APPLICATION SERVICES |
| CONFIGURATIONS | | CONTAINS DIRECTORIES THAT HOLD CONFIGURATION INFORMATION FOR THE NETWORK |
| | SWITCHES | CONTAINS SPECIFIC SWITCH CONFIGURATION INFORMATION |
| | SWITCH CONFIGURATIONS | CONTAINS GENERIC (COMMON) SWITCH CONFIGURATION INFORMATION |
| | POLICY CONFIGURATION | CONTAINS POLICY CONFIGURATION INFORMATION (WHICH ARE REFERENCED BY COMMON SWITCH CONFIGURATIONS) |
| NETWORK DEVICES | | CONTAINS IP DEVICES DISCOVERED ON THE NETWORK BY THE SWITCHES |
| NETWORK POLICIES | (ASSORTED POLICY GROUP NAMES) | CONTAINS NETWORK POLICY OBJECTS THAT THE SWITCH READS AND APPLIES TO ITS FLOWS |
| | DEFAULT (POLICY GROUP) | THE DEFAULT POLICY GROUP IS ALWAYS PRESENT TO ALLOW THE SWITCH TO FUNCTION IF A NETWORK MANAGER HAS NOT YET SET UP ANY OTHER BUNDLES. IT CANNOT BE REMOVED |
| PEOPLE | (ASSORTED SUBSCRIBER GROUP NAMES) | CONTAINS INFORMATION ABOUT SUBSCRIBERS, AND CAN CONTAIN OTHER SUBSCRIBER GROUPS |

TABLE 1

FIG. 12A

| FIG. 12A |
|---|
| FIG. 12B |

FIG. 12

| | | |
|---|---|---|
| SERVICE BUNDLES | | CONTAINS THE SERVICE BUNDLES THAT HAVE BEEN CREATED BY THE SUBSCRIBER. A DEFAULT SERVICE BUNDLE IS ADDED UPON THE SUCCESSFUL CREATION OF A NEW DOMAIN (SEE DEFAULT POLICY GROUP) |
| SERVICE ELEMENTS | | CONTAINS DIRECTORIES THAT HOLD SERVICE ELEMENTS |
| | ACTIVATION PERIODS | CONTAINS ACTIVATION PERIODS. THE "ALWAYS" ACTIVATION PERIOD IS ADDED UPON THE SUCCESSFUL CREATION OF A NEW DOMAIN |
| | CLASS OF SERVICE | CONTAINS CLASSES OF SERVICE. SEVERAL COS's ARE ADDED UPON THE SUCCESSFUL CREATION OF A NEW DOMAIN, INCLUDING DENY, LOWQOS, MEDIUMQOS, HIGH QOS, AND CRITICAL QOS |
| | FLOW DIRECTIONS | CONTAINS FLOW DIRECTIONS. AS THERE ARE ONLY 3 (INBOUND, OUTBOUND, AND BI-DIRECTIONAL), THEY ARE ALL ADDED UPON THE SUCCESSFUL CREATION OF A NEW DOMAIN, AND CANNOT BE REMOVED |
| | APPLICATIONS | CONTAINS APPLICATIONS |
| | SOURCES | CONTAINS SOURCE IDs. A "DYNAMIC" SOURCE IS ADDED UPON THE SUCCESSFUL CREATION OF A NEW DOMAIN |

TABLE 1

FIG. 12B

MANAGING CONTENT RESOURCES

CROSS-REFERENCE TO RELATED APPLICATIONS

This application claims the benefit of U.S. Provisional Application Ser. No. 60/222,038 entitled "DIRECTORY-ENABLED BROADBAND SERVICE NETWORK," filed on Jul. 31, 2000, which is incorporated herein by reference.

FIELD OF THE INVENTION

This invention relates to managing resources and, more particularly, to managing content resources.

BACKGROUND OF THE INVENTION

Many types of content resources are available. Examples include news, entertainment, and business content, advertising, movies, sportscasts, legal databases, medical journals, weather forecasts, and restaurant menus.

Effective management of content resources is important in the Internet economy. Numerous models exist for generating revenue in connection with the content resources, including advertising. The more specifically targeted advertising is, the more value the advertising has, and, therefore, the more money is generated per advertising unit. In at least some current models for targeting advertising, the content provider site is used as the basis for determining the characteristics of advertising based on the content being retrieved. For example, if a user is viewing a cooking program, it may seem reasonable to advertise cookware and kitchen goods. However, this type of model relies on an inference that the use of a particular type of content implies interest in advertising relating to that particular type of content. Thus, for example, if a user is watching a NASCAR race, it might be inferred that the user is interested in buying sports cars, when in fact a 64-color crayon set might be more appropriate because the user is actually a child admiring the colors on the cars.

Another model for generating revenue from content resources is content provided for a fee. Pay-to-View (one-time charges) and premium channels (fixed recurring charges) rely on models in which the consumer pays directly for content. However, in the case of a onetime charge, it may be difficult to find consumers willing to pay for the content, primarily because they probably are not aware that the content may be provided from this resource. In the case of fixed recurring charges, the challenge is making the content available when the user wants to enjoy it.

The ability to easily introduce new content into a delivery infrastructure can be helpful to achieving effective content resource management. Currently, a content resource (e.g., CNN, Wall Street Journal, or PC Backup content) is hard coded into an HTML (Hypertext Markup Language) page. On those occasions when it is necessary to rewrite the HTML text each time a new piece of content is added, the effort required to incorporate all possible combinations of available content will be beyond the abilities and resources of substantially all providers.

An Internet portal is a Web page (or set of Web pages) providing a one stop browsing service to the system user. The value of an Internet portal solution can be measured in terms of the branding of the portal and the advertising that is provided through the portal. However, it can be challenging to attempt to ensure that the advertising is seen and to gauge the size of the audience. One way to help make sure that the portal is used is by configuring the portal as a captive portal, which provides access to various content resources through the portal, but also prevents or restricts access to the network through any interface other than the portal. Captive portals not only help ensure that the user sees the branding of, and advertising on, the portal, but also allow for better monitoring and for more effective generation of charges for user access to premium content resources. A challenge in the case of a captive portal is to help the portal to scale to support not only a large number of system users, but also high bandwidth applications.

An approach known as Remote Authentication Dial-in User Service (RADIUS) has been proposed as a method for provisioning system user configuration and administration for rudimentary Internet Protocol (IP) communications. RADIUS servers rely on a flat file system that requires complex configuration tools to handle advanced configuration, profile assignment, or relationship maintenance.

SUMMARY OF THE INVENTION

A method and system are provided for use in managing content resources. A request is received from a system user ("subscriber", who may be a new, potential, or existing subscriber) for access to a source of content resources. Once the system determines that the subscriber is authorized for access to the source, a portal Web page is generated based on a set of content element data applicable to the subscriber. The portal Web page is returned to the subscriber. A system of the present invention has a switch for receiving requests from Web browsers, a content resource management engine in communication with the switch, and a billing system in communication with the content resource management engine. Further, the system determines a subscriber category to which a subscriber belongs. The system determines a content access rule ("policy") that applies to the subscriber category and to the category of content resources. The rule/policy is applied to the request.

Implementations of the present invention may provide one or more of the following advantages. An infrastructure is provided that allows subscribers and administrators to manage and direct content resources effectively. Premium content can be matched with subscribers interested in consuming the content. Content resources can be organized and managed dynamically. New content resources can be integrated quickly and directly into an available set of content resources that a subscriber can consume. An individual subscriber can configure and manage the presentation of the subscriber's desktop as well as the specific content that the subscriber wishes to incorporate or remove from the desktop. A network provider can control the rendering (the translation of user information into HTML for browser display) of the desktop, which allows the network provider to manage the desktop. A subscriber can specifically select premium content and a network provider can drive specific content to the subscriber based on interests or relevance. Content of interest and pertinent advertising can be organized under a concept of communities of interest, including communities based on lifestyle (e.g., camping), region (e.g., local events calendar), age (e.g., retirement), business (e.g., marketing or networking), and building (e.g., cafeteria menu or condominium association meeting). Subscriber self-service can be provided, to replace manual administrative operations with automatic methods that provide the same or a greater level of security while enhancing the subscriber experience with rapid and reliable updates. A system can be provided that facilitates the determination of whether a subscriber is allowed to gain access to specific content resources, depending on the subscriber's characteristics, group memberships, and previous actions. In particular, a computing architecture can be provided that supplies an organized (e.g., hierarchical) subscriber profile definition with service domain inheritance through the utilization of data organization objects such as directory data model (schema) objects. Accordingly, deployment, network footprint race, and advanced revenue generation can be eased by the use of organized (e.g., hierarchical directory) services to administer, store, and provision subscriber and application profiles and switching behaviors in an infrastructure of intelligent broadband access service switches. By deploying only the policies needed for each subscriber and using a portal to drive policy distribution, switches can be scaled to provide not only control over network resources but also content resources. Because policy enforcement occurs in the switch that processes all subscriber traffic, the solution can manage access to low bandwidth and high bandwidth content.

Other advantages and features will become apparent from the following description, including the drawings, and from the claims.

BRIEF DESCRIPTION OF THE DRAWINGS

FIG. 9A is the first part of a flow chart illustrating a procedure for synchronizing service bundles and network policies according to various embodiments of the present invention.

FIG. 12A is the first part of a table containing data that may be used in the systems or procedures of FIGS. 1-11.

FIG. 12B is the second part of the table in FIG. 12A, the table containing data that may be used in the systems or procedures of FIGS. 1-11.

DETAILED DESCRIPTION

Figure 1:
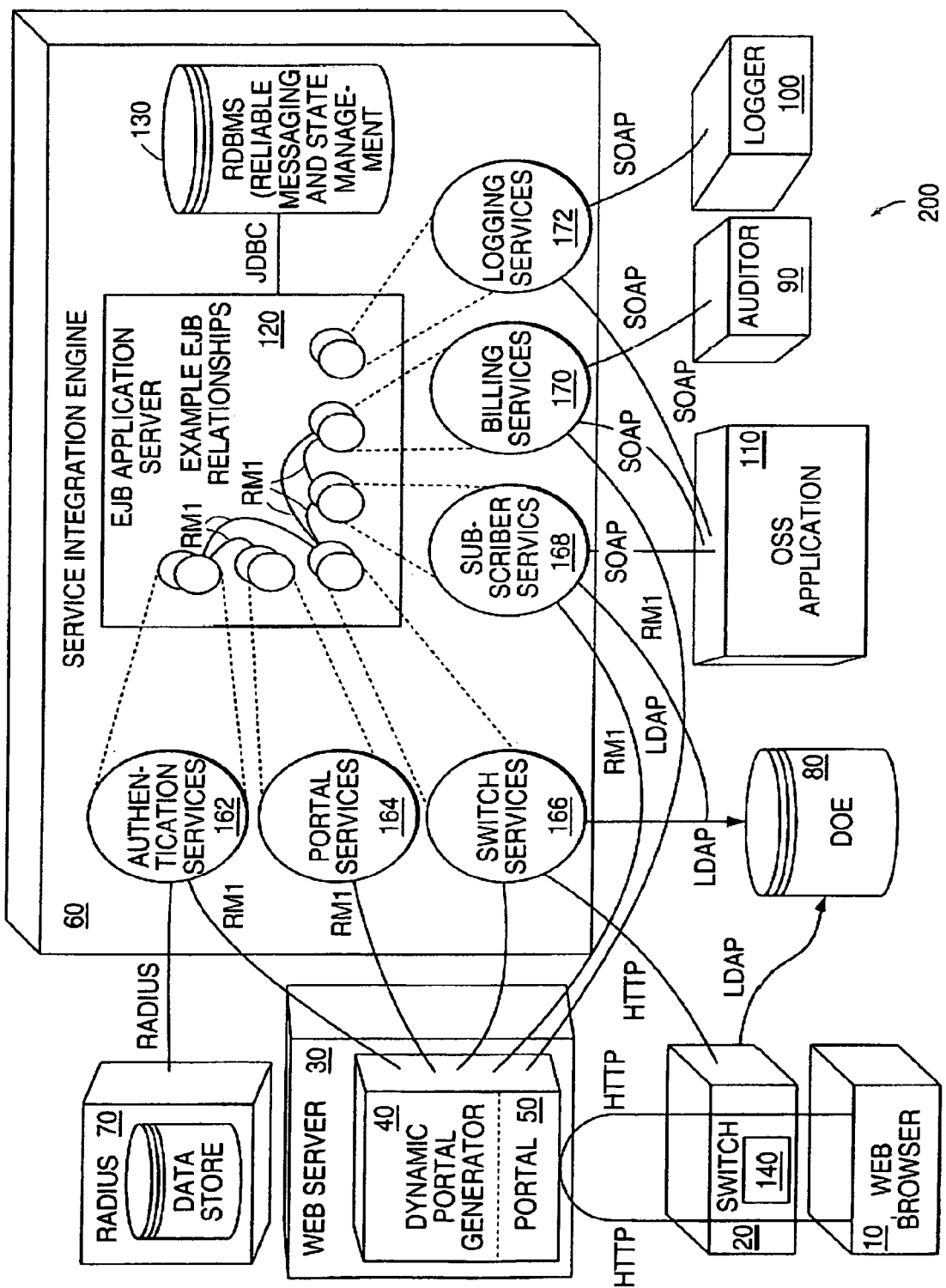
FIG. 1 is a block diagram of content resources management systems of various embodiments of the present invention.

According to the system and method of the present invention, a content management system is provided that links network providers, content providers, and subscribers for developing, distributing, managing, and paying for content resources. The system continually evaluates how the responsibilities for administering content resources are distributed. The network provider acts as an intermediary between a content provider and a subscriber, such that the network provider has primary responsibility for many aspects of content management. It can be in the best interest of the network provider to transfer or make available as much of the administration functionality as possible to either the content provider or the subscriber. For example, if the subscriber wants to move some streaming ticker content from the bottom of the screen to the top of the screen, it is useful to avoid requiring the subscriber to call up the network provider's technical support center to request that the screen template be changed. The subscriber would be better served by acting on the subscriber's own to drag the ticker from the bottom of the screen to the top and have the network provider recognize thereafter that this change has occurred.

On the other hand, in the case of content that includes advertising or service bulletins from the service provider, it is more likely to be appropriate to prevent the subscriber from controlling such content, since the subscriber may prefer to minimize, cover, or push the content resources off the screen. Similarly, it is useful if the addition of new content resources by a content provider does not require a service call to the network provider. However, while the content provider may be able to add new content, it is desirable that the accounting and charging for the network (and possibly content) resources remain under the control of the network provider.

While administrative responsibility for various elements relating to content resources may vary from element to element, the ultimate authority for each element follows a fixed hierarchy that is managed in a directory (which may have relational database aspects). In a specific implementation, the network provider has the ultimate control over all elements relating to content resources; the content provider has control over some elements, but can always be overruled by network provider policies (rules restricting, limiting, permitting, or enhancing specific content) implemented in the directory; the subscriber also has some administrative controls, but only at the discretion of the content provider and the network provider.

A hierarchy of authority is also provided for billing and monitoring. In a specific implementation of the present invention, the network provider, as an intermediary, is ultimately in the position of controlling all elements of billing for content resources. The network provider may choose to outsource billing to the content provider. However, such a model may not scale appropriately: this would be akin to a person living in Boston getting one bill from Company A for a call to San Francisco and another bill from Company B for a call to Atlanta, and a third bill from Company C for a call to Amsterdam. In at least some cases, the only billing model that scales effectively is one in which the network provider monitors content resource usage and bills either the subscriber or content provider based on an implicit financial agreement between the subscriber and the content provider. This does not preclude both the subscriber and the content provider from being able to monitor and meter content resource usage. Particularly where distributed caches are in use, it is highly useful for network providers to be able to have an infrastructure that notifies content providers of the usage of various content elements, as described in more detail below.

FIG. 1 illustrates an exemplary content resource management system 200 having a service integration engine 60 that communicates with a RADIUS data store 70, a Web server 30, a switch 20 (hardware that connects multiple end-users of a network, with isolation of each end-user's data traffic), a data organization entity (DOE) (e.g., a directory server) 80, an Operations Support Systems (OSS) application 110, an auditor system 90, a logger system 100, and a Web browser 10 communicating with Web server 30 via switch 20. Web server 30 has a Dynamic Portal Generator (DPG) 40 (a Java servlet, which is a process that can deliver content to a Web browser in a state-based manner) and a Portal Renderer 50.

Service integration engine 60 has an Enterprise Java Bean (EJB) application server 120 for EJB distributed java objects including: authentication services 162 communicating via RADIUS with authentication data store 70 and dynamic portal generator 40, via Remote Method Invocation (RMI); portal services 164 communicating with dynamic portal generator 40, via RMI; switch services 166 communicating with switch 20, via Hypertext Transfer Protocol (HTTP) or Common Open Policy Service (COPS), and DOE 80, via Lightweight Directory Access Protocol (LDAP), subscriber services 168 communicating with dynamic portal generator 40, via RMI, DOE 80, via LDAP, and OSS application 110, via Simple Object Access Protocol (SOAP); billing services 170 communicating with dynamic portal generator 40, via RMI, OSS Application 110, via SOAP; and auditor system 90, via SOAP, and logging services 172 communicating with OSS Application 110, via SOAP, and logger system 100 via SOAP. Service integration engine 60 also has a relational database management system (RDBMS) 130 communicating with server 120 via Java Database Connectivity, or JDBC.

Figure 2:
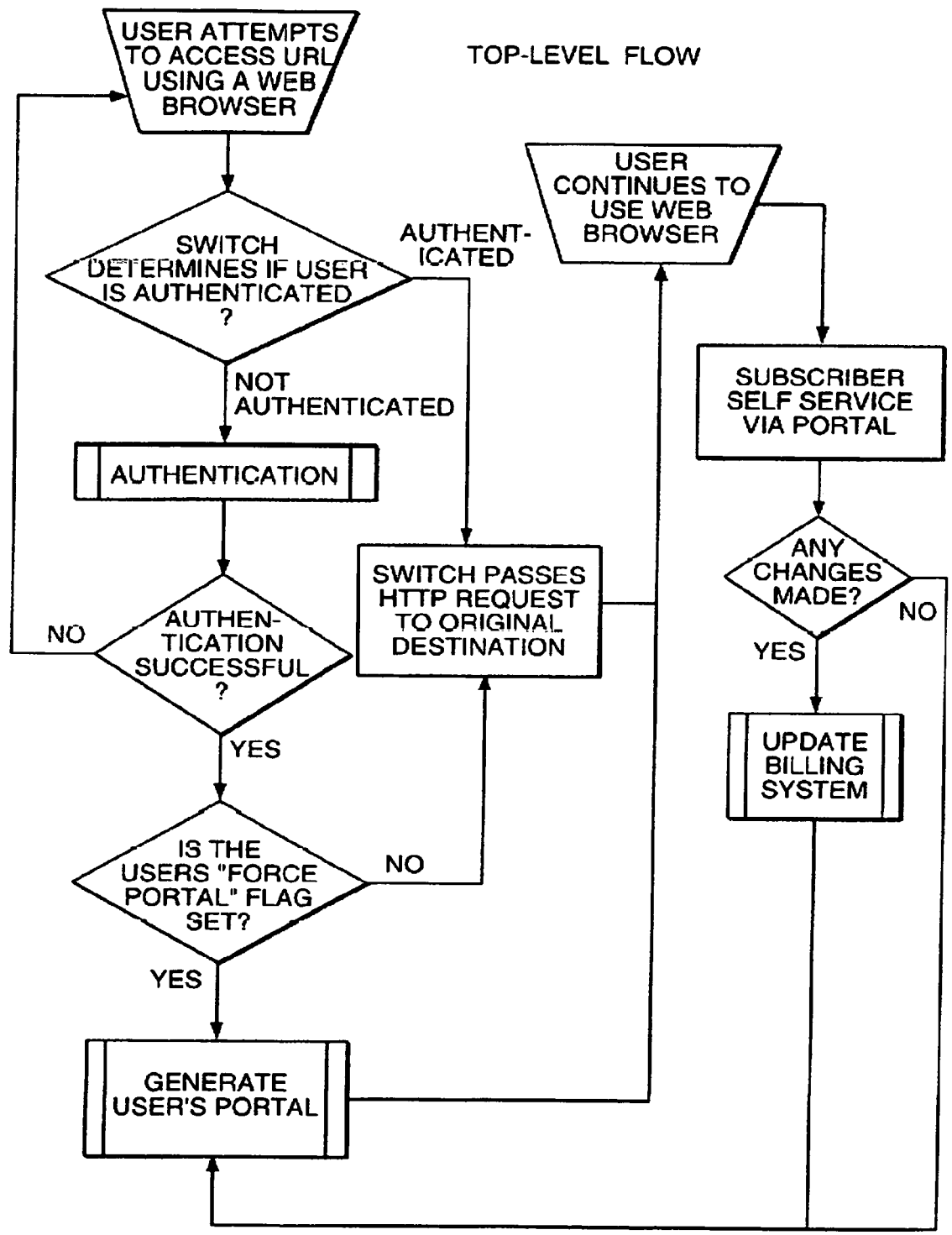
FIG. 2 is a top-level flow diagram of procedures of content resources management systems of various embodiments of the present invention.
Figure 3:
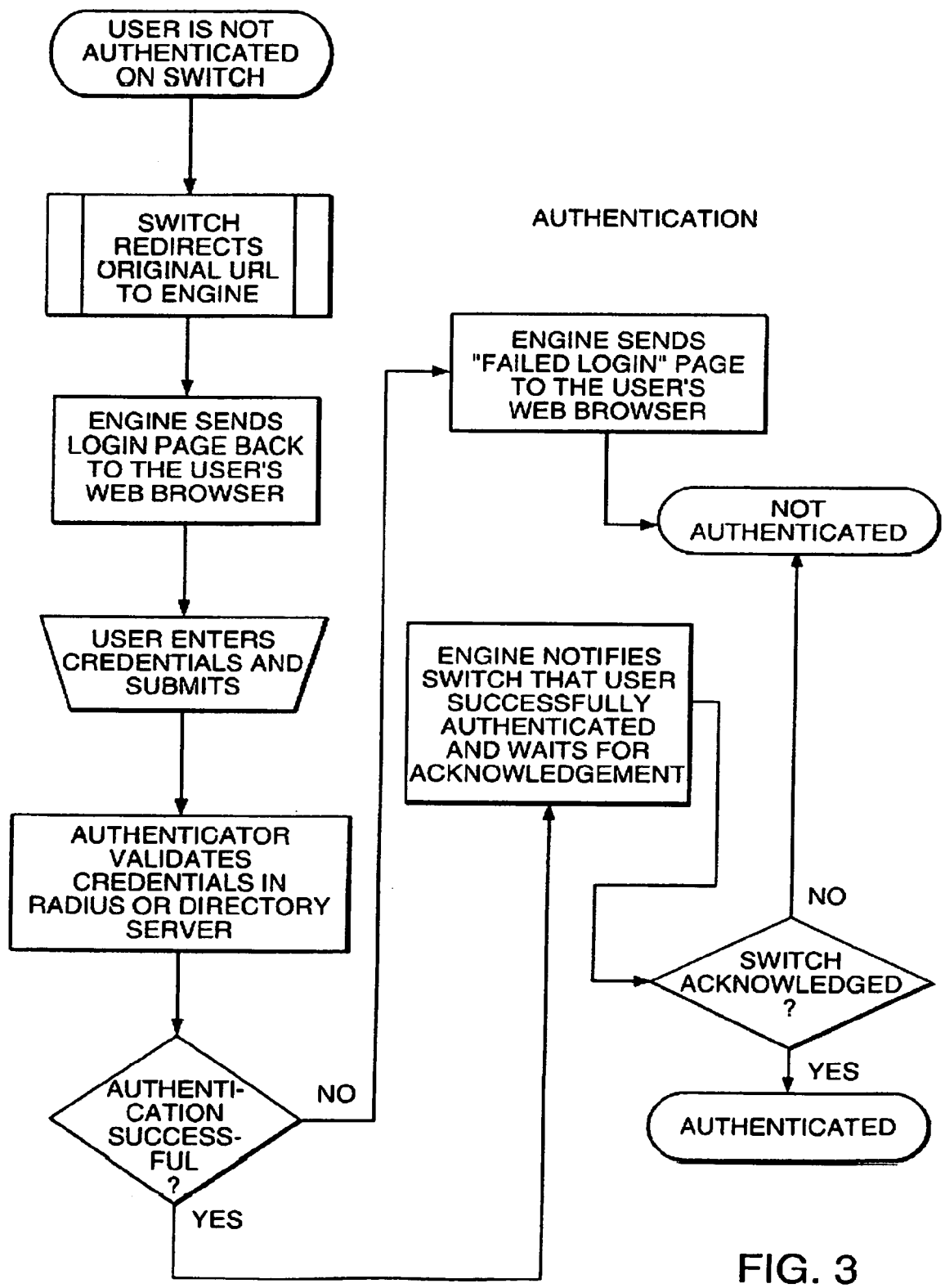
FIG. 3 is a flow chart illustrating a procedure for authentication according to various embodiments of the present invention.

As illustrated in FIGS. 1-2, service integration engine 60 and DPG 40 cooperate with switch 20 to supply a subscriber with a portal providing access to network applications and services. Referring to FIG. 3, when the subscriber first attempts to gain access to the network through browser 10, switch 20 verifies that the subscriber is authorized for such access. The switch does so by determining whether the subscriber's IP address, which is supplied in a request to switch 20 by browser 10, is present in an internal table 140 that contains the IP addresses of authenticated users or trusted users (subscribers that do not require explicit authentication). If the subscriber's IP address is not found in table 140, the switch redirects the subscriber's request to DPG 40, passing along the subscriber's requested URL (Uniform Resource Locator) and the switch's IP address. The redirected request is received by DPG 40, which responds to the request by sending a login page back to the browser 10. DPG 40 then connects to a session EJB residing in server 120 to notify service integration engine 60 that a new subscriber has been detected.

DPG 40 communicates with authentication services 162 to determine whether the subscriber is authorized to communicate on the network. Depending upon its configuration, authentication services 162 performs either as a proxy to RADIUS data store 70 or by a lookup in DOE 80 using LDAP. Once authentication services 162 confirms that the subscriber is authorized to communicate on the network, the session EJB notifies switch 20 which will then retrieve the policies associated with the subscriber from DOE 80 using LDAP.

Figure 4:
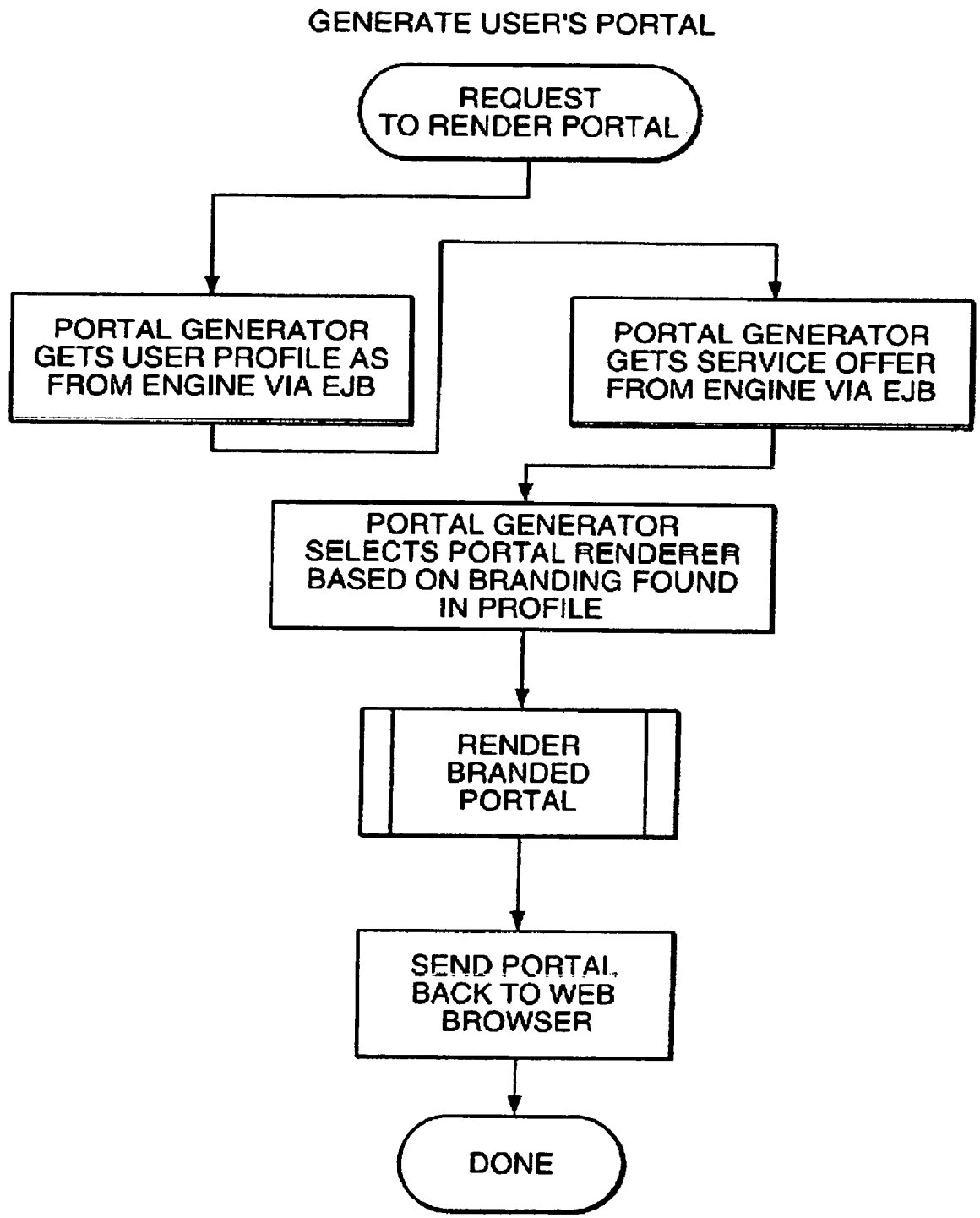
FIG. 4 is a flow chart illustrating a procedure for generating a user's web portal according to various embodiments of the present invention.

After retrieving some or all of the policies controlling the subscriber's ability to gain access to specific content and network resources, switch 20 sends an acknowledgement back to the session EJB. Upon receiving the acknowledgement, the EJB retrieves the subscriber's profile from DOE 80 using LDAP. The subscriber's profile contains information about the subscriber, including identifications of applications and services to which the subscriber is subscribed, as well as data that may be used to reconstruct the subscriber's portal in accordance with customizations the subscriber may have specified. Referring to FIG. 4, the data is sent back to DPG 40, which then passes the data to Portal Renderer 50, based on the brand setting for that subscriber, so that Portal Renderer 50 can dynamically construct the subscriber's portal. The brand setting provides a means for displaying the network provider's logo in each portal presented to the subscriber. The portal is tailored to the subscriber's preferences. For example, any network applications or services the subscriber has purchased through a service offer to which the subscriber subscribed, or are required to have, are made accessible to the subscriber through links on one or more portal pages.

Figure 5:
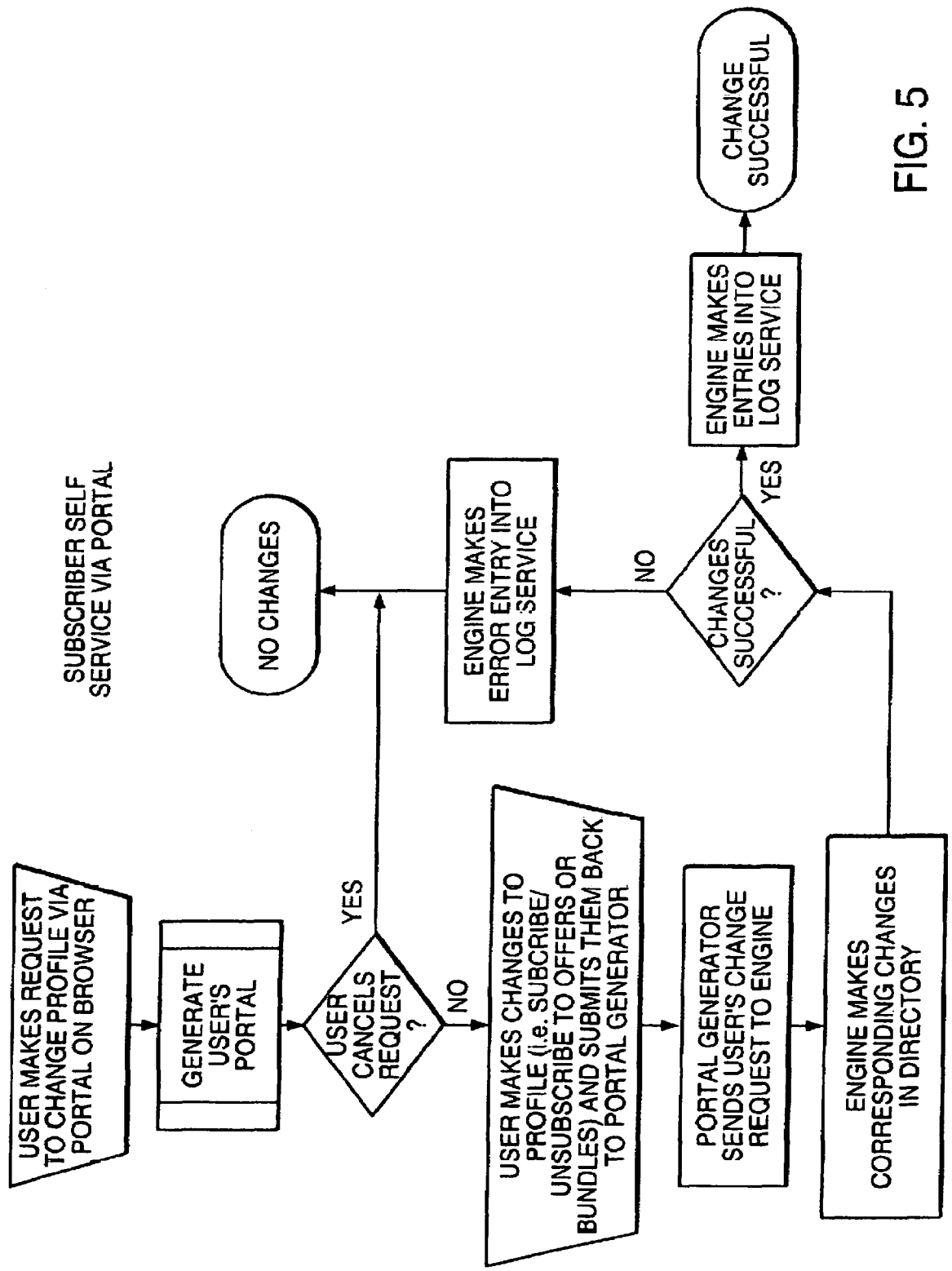
FIG. 5 is a flow chart illustrating a procedure for providing subscriber self-service via a web portal according to various embodiments of the present invention.

The subscriber's Web browsing experience is enhanced by the portal personalization capability provided by DPG 40. The network provider and its affiliates may also choose to push advertisements through the subscriber's portal, specifically targeted to appeal to the subscriber based on the data contained within the subscriber's profile (e.g., pertaining to interests or subscriptions). Referring to FIG. 5, the portal also provides self-service mechanisms for the subscriber to purchase additional applications and services, as well as cancel a service to which the subscriber has previously subscribed. The subscriber is also permitted to subscribe to any other services that the network provider makes accessible to the subscriber.

Figure 6:
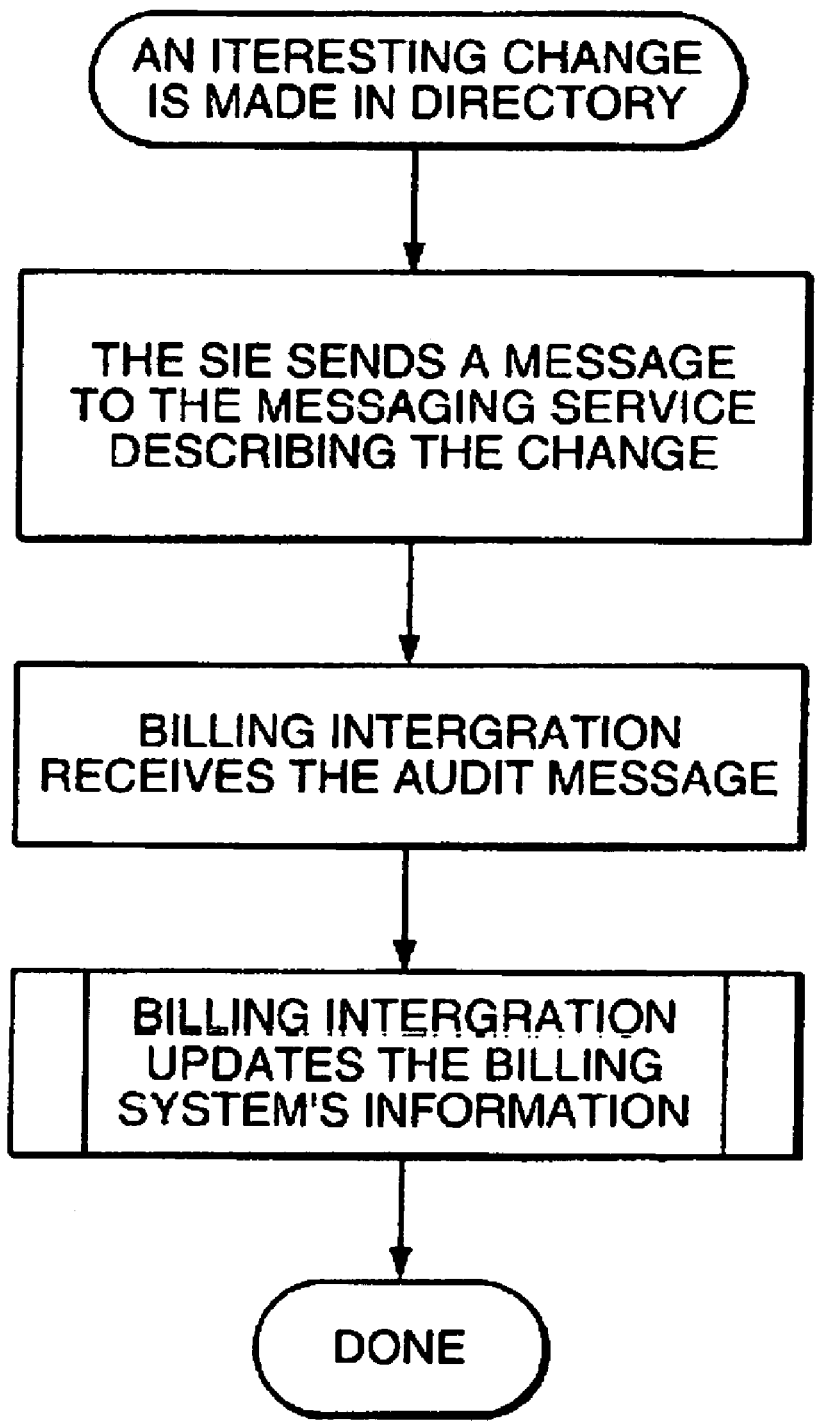
FIG. 6 is a flow chart illustrating a procedure for updating a billing system according to various embodiments of the present invention.

Once the portal has been generated, the Portal Renderer 50 transmits the portal to the DPG 40 to be transmitted back to the subscriber's Web browser. The original URL request that initiated the process may also be serviced either through the portal or in a separate Web browser instance. Once browsing in the portal, the subscriber may opt to use any of the applications or services that have been made available to the subscriber in accordance with the subscriber's current service offer. Any self-service changes made by the subscriber are transmitted from the subscriber's browser to DPG 40 via an HTTP request. DPG 40 propagates the changes to the session EJB on server 120. Upon receiving the data, the session EJB makes corresponding updates to the subscriber's profile in DOE 80 using LDAP. Referring to FIG. 6, the session EJB sends, by way of a messaging service, billing or network event data pertaining to the purchase or cancellation to OSS application 10, which may belong to the network provider or an affiliate involved with the service or application. Network event data may pertain to a DPG 40 or switch 20 event that determined the activation or usage of particular content resources.

The billing or network event data is sent over the messaging service in XML (eXtensible Markup Language) format. Although the messaging service uses XML, the interface to third-party billing systems could take any of a number of different formats including RADIUS accounting records and Internet Protocol Detail Record (IPDR). Other OSS applications may be integrated with service integration engine 60 by transmitting and receiving XML messages to and from engine 60, which provides a loosely coupled means of third-party integration. Integration modules can be added into or detached from engine 60 dynamically by monitoring logging or billing events arriving in the message queues of the reliable messaging service 130. RDBMS 130 is provided to help ensure delivery of pertinent messages to the integration modules. Third-party applications need only have the ability to encode and decode the XML messages that are validated with Document Type Definitions (DTDs) supplied, for example, by Ellacoya Networks, Inc. OSS application 110 and other OSS applications may also use the messaging service to send information to service integration engine 60 that might result in changes to DOE 80. Such changes may result from third-party user management, application or service creation, or the addition of new subscribers or changes in service pricing.

During the activities performed by service integration engine 60, events are sent to logging services 172 and billing services 170. Logging is performed so that problems with the system can be audited for security purposes, tracked and investigated. Specific implementations may react to log messages of different levels of importance in different ways. For example, the system administrator may install a logging service that is configured to email or page network administrators upon receiving a critical log message. Auditing services are supplied into the system to provide audit trails that can be used later to resolve billing issues and support interactions between customer service representatives and the subscribers. The auditing systems are normally configured to monitor any events that result in a change in the directory, as well as certain events sourced by service integration engine 60 or by switch 20 that might be used for billing (and other OSS systems) decisions, such as metered network service or changes or activations of subscriptions or application usage. Monitoring services are also made available to the system administrators who may then use the services to observe the operating performance of the system from time to time. The services present statistics and other data through a graphical user interface that helps the administrator maintain the system.

Service integration engine 60 can provide authentication as an off-board service to switch 20. Switch 20 can be configured so that when switch 20 receives a request from a client (e.g., browser 10) that switch 20 needs to identify as authenticated, switch 20 offloads the task of authenticating the client to service integration engine 60. When a switch such as switch 20 is responsible for authenticating clients itself (referred to as "onboard" authentication), some of the switch's resources are consumed in communicating with a directory server such as server 80 or a data store such as store 70. By off-loading the overhead of authentication to an external resource such as engine 60, the switch can free up its resources to be employed for other tasks.

Switch 20 uses authentication services 162 when switch 20 is supplied with a URL to which unauthenticated client requests are to be redirected. From the perspective of switch 20, the redirected request is no different from any other request in that switch 20 need not interact with any external entities; switch 20 is simply redirecting the request.

A difference between on-board and off-board authentication is that while authenticating on-board, switch 20 can immediately update its policy tables depending upon the replies from authentication services 162. In a specific implementation in the case of off-board authentication, switch 20 does not update any policy tables, since switch 20 redirected the request without any expectation of a reply. In the off-board case, service integration engine 60 notifies switch 20 when a subscriber has been authenticated.

In a specific implementation, the subscriber is, prior to being authenticated, only authorized to communicate with service integration engine 60; all other services (premium or otherwise) are inaccessible until the subscriber completes the authentication process. Provisions in switch 20 may permit certain traffic to pass through switch 20 while a subscriber is unauthenticated. For example, traffic deemed important to unauthenticated subscriber, such as Address Resolution Protocol (ARP) and Dynamic Host Configuration Protocol (DHCP), or electronic mail, may be permitted to pass in accordance with configuration options in switch 20.

The process begins when switch 20 receives a request from a previously unauthenticated subscriber, i.e., a subscriber that has an unauthenticated or untrusted (e.g., specially configured) IP address according to the tables of switch 20. Switch 20 redirects the subscriber's request to authentication services 162 via a pre-configured URL. The redirected request identifies both the originating subscriber as well as the subscriber's target request (e.g., a particular Web page). Authentication services 162 sends a login page back to the subscriber in order to obtain the subscriber's credentials. From the perspective of the subscriber, the subscriber has issued a request, e.g., for a page at http://www.uspto.gov, and has instead been returned a login page. The subscriber submits the subscriber's credentials back to authentication services 162 which in turn authenticates the credentials. The authentication mechanism that authentication services 162 employs is identified via a configurable property. This property determines whether the authentication services 162 use a proxy technique in sending the authentication request to RADIUS data store 70 or look up the subscriber in the DOE 80 using LDAP. The authentication mechanism can be adapted as the security requirements of the operational environment change.

If the subscriber's credentials are found to be invalid, an error page is delivered to the subscriber and the procedure terminates. Presumably, especially when it is possible that a typographical error has occurred, the subscriber re-enters the subscriber's credentials and the process restarts. If the subscriber's credentials are found to be valid, service integration engine 60 notifies switch 20, identifying the subscriber. Switch 20 then retrieves and installs the subscriber specific policies for the subscriber and notifies service integration engine 60 when it is ready to accept traffic from the subscriber.

At this point, service integration engine 60 may honor the initial request of the subscriber by sending a URL redirect of the original content request back to the subscriber's browser. Optionally, if a "Force Portal" flag exists in the subscriber's profile, engine 60 causes the subscriber's portal page to be delivered to the subscriber in place of the actual requested target.

As described above, system 200 has the ability to deliver a portal personalized to the preferences of the subscriber. The preferences are recorded in DOE 80 along with the policy configurations for the subscriber. The switch policies and the portal are inherently correlated. When delivered to the subscriber, the portal is an accurate reflection of the policies that are used by switch 20. Conversely, when the subscriber alters the subscriber preferences via the portal, the switch policies are also altered.

Portal Renderer 50 delivers the subscriber's portal by retrieving a profile for the subscriber using the subscriber's profile in DOE 80. Different implementations of Portal Renderer 50 may utilize different presentation techniques when presenting the portal to the subscriber. For example, DPG 40 utilizes an HTTP-based browser, or a Web browser as part of a rendering strategy. DPG 40 accesses the subscriber's profile via service integration engine 60 and renders HTML pages with content or links to content in accordance with the subscriber's subscription information that is maintained in DOE 80. Alternatively, all or some of the rendering function could be performed as well or instead in the host using local (custom) rendering software.

The subscriber interacts with the Web-based DPG 40 by clicking on hyperlinks. DPG 40 receives the HTTP requests generated from the hyperlinks and forwards requests to service integration engine 60. Examples of requests bound to links are: subscribe or unsubscribe the subscriber to service bundles; schedule services to be started or stopped at some future time; request details about a service offer. A service bundle may be or include a collection of content resources grouped together either for pricing or resource management purposes. For example, a service bundle may be or include all content resources provided by a particular content provider or all content resources paid for with a single monthly fee.

Subscriber self-service is provided to allow a subscriber to change, on the subscriber's own, the services to which the subscriber can gain access. Subscriber self-service is accomplished by providing a Web page that is customized for a subscriber to indicate the services to which the subscriber can gain access. The Web page, which is organized to show the services to which the subscriber has already subscribed, and the services to which the subscriber can optionally subscribe, is created dynamically based on the information in the subscriber's profile, including:

1) Personal information such as first name, last name, email address, password and branded portal (a portal with the Network Provider's logo and look and feel characteristics).
2) Personal portal preferences such as window locations, color schemes, and backgrounds.
3) Subscription information such as the service offer and the optional service bundles to which the subscriber has subscribed. A service offer may be or include a collection of service bundles provided to allow more abstract groupings of services and service bundles.

Subscriber self-service allows the subscriber to change the subscriber's personal information, subscription information, and personal portal preferences. In specific implementations, some or all of the portal personalization can be controlled by the subscriber. At the network provider's discretion, some personalization controls can be administered by the network administrator when control is deemed more important than operational savings. The network administrator can manage the personalization controls either through the same Web-based interface or through an API that may be invoked by either a custom tool or an integrated OSS solution. Both the API and the HTTP-based interfaces are supported by logic in service integration engine 60 which helps prevent incomplete or inconsistent information from being accepted in an operational environment.

System 200 can provide direct content resource management by the content provider, the network provider, the subscriber, or a combination of some or all of them. A discussion of the elements that define content resources is helpful for showing how the elements are combined to support the dynamic addition of new, premium content resources. Multiple elements associated with content management are integrated into the architecture. These elements may fall into the following categories: content type, content layout, network resource requirements, content billing, content organization, content location, and content indexing rules. In a specific implementation, each of these categories is defined for every piece of content in order to facilitate the deployment of new content.

The content type category refers to information describing the format of the content, how the content should be rendered, and the type of presentation model that should be used to display the content. Some of the characteristics that may be seen in the description of the content type pertain to whether the content is streaming, static, or interactive, whether the content is text or graphical, and whether the content is pushed at the subscriber, driven by circumstances of the content provider's choosing, or pulled by either the subscriber or the subscriber's browser.

Content layout refers to how the content is organized for presentation, e.g., on a display screen. Some examples include the dimensions of the screen space required to present the content, the controls appropriate to managing the content, whether the content always needs to be fully visible to the subscriber, whether the content can be minimized, whether sound is supplied or it may be turned off at the subscriber's discretion. In addition, content layout also refers to the means whereby content specific help can be retrieved.

Network resource requirements describe the assumptions content providers have made about the network in order to successfully exchange content between the providers and the subscribers. Possible network resource requirements include the amount of bandwidth required in one direction or both (e.g., streaming video, telephone call), the amount of delay that can be tolerated (e.g., video conference, text file download), the tolerable amount of delay variations (jitter), the number of concurrent data streams, the topology of the streams (e.g., one point-to-point, multiple meshed point-to-point, point-to-multipoint or multicast, multipoint-to-point), and security requirements (e.g., tunneled, encrypted, may only transit specific third-party networks).

Content billing relies on rules for determining the amount charged for and the method used to effect payment for such content. For example, bulk advertising involves a fee paid by the content provider (advertiser) to the network provider. In the case of a pay-to-view movie, the subscriber is likely to pay the content provider either directly or through the network provider. In turn the network provider may either be paid a flat rate by the content provider or the network provider may charge the content provider or the subscriber a surcharge per movie, or a charge for the amount of time the content was consumed, or a per packet or per byte fee.

Typically, there are two basic types of arrangements through which subscribers pay for content: subscriptions and usage charges. A subscription is a fixed, recurring charge for access to an entire catalog of content. Usage charges apply to specific events and can be based on the number of events (e.g., $2.00 per movie) or a quantity associated with an individual event (e.g., per minute, packet, or byte).

Among the parties to any content based transaction for a fee, namely, the subscriber, the content owner, and the network provider, each will account for its participation after a transaction. The network provider may collect fees from the subscriber and then pay a fee to the content owner, or the content owner may charge the subscriber and pay a fee to the network provider. The network provider may only wish to resell content that meets a set of minimum terms, so the terms must be included in the description of the content. Any of these models may be viable; however, other possible financial agreements may exist between any or all of the three parties. These agreements may be documented in writing in generic terms. In particular, an agreement between the network provider and another of the parties is not likely to specify, for example, "x" dollars for movie 1, and "y" dollars for movie 2. It is more likely that the agreement is either based on the network resource requirements or some other, more generic criteria, such as by category (e.g., any movie less than 2 hours in length).

Provisions of written agreements are translated into a set of network consumable rules that the network provider can incorporate dynamically. Accordingly, when a content provider introduces new content, the content billing rules and network resource requirements can be passed to the network provider dynamically with little or no burden on the network provider to negotiate and validate every piece of content. The content billing element includes pieces of information that describe the financial model associated with the related piece of content, e.g., per a preexisting, binding contract.

Content organization describes how various content resources are organized on a particular subscriber's system. Since a subscriber tends to interact with several content resources simultaneously, there are some content resources that are likely to be present occasionally, and other content resources that are a permanent part of the subscriber's interface into the network. For example, a subscriber may always want a stock ticker to be active, but a movie will be active for only two hours. The subscriber's ability to determine what is active and stays active can be extended to also allow the subscriber to specify where a particular piece of content should reside when it is active. The portal is a typical end product of available content resources and their layout.

The subscriber is able to customize and organize content resources. In particular, in addition to or instead of having the content provider determine aspects of the appearance of the desktop presentation, the subscriber can determine the appearance of the desktop to the point of selecting individual content elements to present, when to present them, and how to present them (i.e., in rendering). To support this ability, the network provider maintains data pertaining to the subscriber's selections and preferences for the appearance of the presentation the next time the subscriber logs into the network. Thus, it is helpful to supply a mechanism that allows the subscriber to specify to the network provider what the portal should look like.

The content location element describes the location from which content resources should be retrieved, i.e., the source. Determining the source for content can be challenging in conventional networks. In some cases, content is to be retrieved from various sites all over the world. In some cases, content is cached based on demand. In some cases, a load balancing system manages the content resources. Further, when content resources are not directly attached to the local network provider's network, the optimal transit network to use for retrieval of the content may also be important on a performance or a financial basis. While a source for content resources can, in some cases, be reduced to a single IP address, such an address is sometimes insufficient in complex modern networks. The content location element has detailed information describing the specified location and path for access to specific content resources.

Content indexing rules help to address content scaling, with respect to at least two issues. First, in regard to scaling, it is prudent to expect premium content to benefit from content organization, particularly as premium content grows. Second, for subscriber customization, where a content provider is targeting specific content to specific subscribers or is restricting content access to a segment of subscribers such as minors, a means is used for describing the value of the content in a way that matches a subscriber's potential interest in that type of content. Content indexing rules address these issues.

When a content provider wishes to add new content, a contract outlining the charging models between the content provider and the network provider may already be in place. The charging models may specify a flat rate, a surcharge on the content, or a percentage of the charge to the subscriber. Whether the subscriber is charged by the network provider or the content provider does not significantly alter the contract, merely the direction of the flow of money.

Once the binding agreement is in place between the content provider and network provider, the content provider can provide system 200 with the information described in each content category to automate the installation of the new content item into the set of content resources available to the subscribers. The installation is accomplished either through a administrative interface discussed below in regard to the service wholesale user interface, or through an XML document that includes the categories described above which is down-loaded over the Internet. In the case of content billing category, a reference is provided to one of the charging methods agreed to in the original contract between the network provider and the content provider, as well as the model specific parameters (e.g., Charge Model: Per Usage Surcharge; Surcharge: $2). The XML document may be sent from the content provider directly to service integration engine 60 through an authenticated API that helps to ensure that only the appropriate content provider can add, modify, or delete the content under the content provider's direct control.

With such information captured in the XML document, a new service can be added to the portfolio of services being offered to subscribers with little added configuration burden on the network provider. Thus, when new services are introduced into the portfolio, the process can be automated entirely or substantially through service integration engine 60, or a simple approval interface can be enabled to authorize each new content change from some or all of the content providers.

When service integration engine 60 receives the XML document and the service has optionally been approved, the XML information is encoded in DOE 80 and in other permanent data stores necessary to allow system 200 to incorporate the new content in the infrastructure.

When charge records are generated for the new content, a combination of the charge model, the specific content identifiers (found in the billing and indexing portions of the XML document), and the usage statistics are consolidated into a charge record that is passed to one or more of the appropriate billing systems.

Service integration engine 60 in conjunction with the DPG 40 also provides a scalable captive portal environment. Conventional portal systems have been found to have significant scaling issues, particularly when all portal traffic must be passed through a single server to prevent the portal from being supplanted by either the subscriber or a content provider. Such conventional systems may encounter scaling problems in broadband environments where large numbers of subscribers can also generate large numbers of packets that servers are expected to handle.

To help ensure that the portal remains active, service integration engine 60 may optionally require that every new service request first be presented to service integration engine 60 for validation. Hence, if the portal is inactive, the subscriber has no means for requesting service integration engine 60 for the service. It is possible for the subscriber to try to access the service directly, but there is little point to such an attempt because the request is not allowed through switch 20 until service integration engine 60 configures the policy. By provisioning switch 20 dynamically as the subscriber requests each service, the subscriber will use the portal in order to access the service, rendering the portal in effect captive.

In a specific implementation, use of the portal is enforced even more rigorously by software installed in the subscriber's client to monitor the portal and prevent access to network resources when the portal is inactive.

According to this implementation, a service wholesale user interface allows application service providers (ASPs) to dynamically create new application services using a Web-based interface. The application services are then added to one or more service bundles. A subscriber that has subscribed to the corresponding service bundle sees the new application service appear on the subscriber's Web page the next time the page is reloaded.

Each application service is composed of service elements. The definitions of service elements are created in DOE 80 using the Web-based interface and are consolidated into policies that are installed in switch 20 via service integration engine 60. Each application service includes a name and five service elements. ASPs and network providers are provided with the ability to create and maintain application services by organizing the name and service elements information. In a specific implementation, the ability for the ASP to manipulate service elements is strictly controlled through a separate interface that is available only to the network provider.

To access the service wholesale capabilities model, the ASP first logs into service integration engine 60 using a secure channel and then accesses an administrative bean of service integration engine 60. As used herein, a "bean" is a self-contained, reusable software unit. The administrative bean differs from the standard bean in its ability to serve a set of administrative functions instead of, or in addition to, the standard functions used by non-administrative subscribers. The administrative pages of the DGP 40 communicate to the administrative bean to grant the ASP the ability to create and maintain its own set of application services.

Service integration engine 60 authenticates the ASP in DOE 80 and verifies that the ASP administrator is permitted to make changes to the specific service elements. The verification is performed by testing attributes associated with the ASP to verify that the subscriber is an administrator, and that the subscriber has write access to the appropriate data structures of the DOE. Service integration engine 60 then retrieves location information specifying where the ASP can add or modify its own set of application services. The location corresponds to a branch in DOE 80.

The ASP administrator is provided with a list of its defined application services (including content resources) along with the service bundles by which the services are grouped. The ASP administrator can then (1) create a new application service, (2) modify an existing application service, (3) delete an existing application service, (4) remove an application service from a bundle, or (5) add an application service to a service bundle.

System 200 also provides an ability to dynamically create communities of interest. A subscriber may want to open up the subscriber's system to other subscribers or other subscribers' applications, to allow subscribers to exchange files, run specialized applications, such as games, and work collaboratively on projects business and personal projects.

It is helpful, in supporting a communities of interest model, to provide selective access to individual subscribers while controlling the breadth of access and the potential anonymity of the subscriber providing the access. For instance, a subscriber may want to permit access to only a subset of the subscriber's files on a particular server, or a subscriber participating in a game or a private auction may want to protect the subscriber's identity.

The present invention provides at least two approaches to resolve this issue. In the first approach, a peering infrastructure is defined on each subscriber's machine, which, in specific implementations, can be costly and complex, and difficult to deploy ubiquitously on all subscriber machines. The second approach calls for managing access at the application level at the access point to the network. In this case, the subscribers are provided with a consistent subscriber interface for managing their individual communities of interest. Further, many applications rely on centralized server resources that can be managed directly by the network provider. Access to the service can be controlled by use of policies in switch 20, which allows a new revenue stream for network providers that want to offer selective premium community services, such as network-based gaming. Further, the mapping of actual subscriber IP addresses to anonymous IP addresses in switch 20 can protect the subscriber's identity and the subscriber's local network.

With respect to managing and billing for content resources, OSS integration is part of an overall solution. Many OSS interactions take the form of a request that may be sent by service integration engine 60 to OSS application 110 or a request that is sent by OSS application 110 to service integration engine 60. In a specific implementation, it is assumed, in all operational scenarios, that OSS application 110 is the definitive authority for all pertinent information. For example, when a new subscriber is to be added or an existing subscriber's parameters are to be modified through the Web interface of system 200, a corresponding request is first registered with OSS application 110. If OSS application 110 rejects the requested addition or change, the rejection is passed back through the Web interface and DOE 80 is not updated with the original request. In addition, when OSS application 100 notifies service integration engine 60 of a change, the change is applied implicitly. If the change is inconsistent with existing information in DOE 80, the network administrator is notified of the inconsistency. When service integration engine 60 and OSS application 110 generate requests to each other, the standard interface that is used is XML. The transport of the XML data can be supported with any of a number of protocols including SOAP (HTTP) and Common Object Request Broker Architecture (CORBA). An OSS integration module in service integration engine 60 implements an XML interface. The OSS vendor develops the XML interface according to a Data Type Definition (DTD) provided, for example, by Ellacoya Networks, Inc. The XML interface can be used to send requests to and receive requests from the OSS integration module in service integration engine 60.

As described above, system 200 links network providers, content providers, and users for controlling access to content resources. Content resources include content or services that are directly consumable by subscribers, such as movies, video telephone calls, web pages, advertising content, and streaming content. In particular, system 200 applies DOE (e.g., a hierarchical directory structure or a relational database) to achieve a scalable and distributed subscriber management architecture for subscriber and service provisioning in a service network. The architecture helps to administer the access of a subscriber to content resources located throughout a network.

The ability to control access to content resources reflects that there is value to the content. It is helpful to bringing out the value of the content resources to have subscribers unambiguously or nearly unambiguously identified. The ability to extract revenue for content resources can be hampered by a lack of knowledge regarding who is using content resources, or by a lack of a reliable means of charging either directly or indirectly for the value of the content resources. A content resource can have a premium value to a particular Content or Service Provider or type of subscriber. In some cases, the value is extracted by targeting the content (e.g., advertising) to specific subscribers. In many cases, the more specialized the targeting, the more value can be extracted. The value may be extracted at the direction of the subscriber of the content resources (e.g., movies on demand). Thus, in general, the determination of a subscriber's identity is a helpful and effective contributing tool.

Proximity is a factor in determining the identity of a subscriber. The binding of a subscriber's identity to a physical port on a switch provides a favorable scenario for determining identity. In at least some cases, the farther away, topologically, the subscriber is from the identity checking process, the more difficult it is to verify the identity and preserve that identity across content resource usage. Accordingly, a feature of the subscriber management architecture is the insertion of the subscriber identity management infrastructure in close proximity to the subscriber. In a specific implementation, the subscriber has network connectivity only if and when the subscriber is identified to the edge of the network where the subscriber is attached, which allows identity to be managed with little or no dependence on the location of the content resources in the network.

In a specific implementation described above with reference to FIG. 1, three architectural components are provided that communicate with each other using standard protocols. These components are switch 20, DOE 80, and authentication services 162 and each of them may have sub-components. The components provide an architecture that supports network login capabilities and the management of subscriber services through dynamic subscriptions to pieces of network content.

In a specific implementation of the present invention, three entities are used in performing authentication. A first entity determines when a new subscriber is using the network. To perform this task, the first entity recognizes that a new subscriber is active and initiates an identification process. As long as the subscriber's identity is not known, the first entity limits or prevents network access. The first entity may reside in any of multiple places. One place is an end station using browser 10, which is familiar to many subscribers since subscribers typically log in to end stations anyway. In at least some cases, it may be unreliable to depend on end station software to identify new subscribers, since such software is under the subscriber's direct control and therefore is susceptible to being inadvertently or intentionally subverted.

Conversely, components managed and administered by network managers tend to be less susceptible to subversion. In addition, such components tend to reside in computers that are installed in racks or locked wiring closets and that, therefore, are changed or rebooted infrequently, which lends stability.

The closer to the content resources the subscriber identity is determined, the more frequently the identification process is repeated for the various content resources distributed throughout the network. As a result, in at least some cases, it is advantageous to direct subscriber identification to occur at the ingress of the network, e.g., at switch 20.

The second entity that is used in performing authentication is authentication logic (e.g., a state machine), such as authentication services 162. This entity performs a key authentication process that provides the subscriber with a challenge that requires the subscriber to prove a subscriber identity. If the subscriber fails to meet the challenge, the restrictions on network access remain. If the subscriber succeeds in correctly responding to the challenge, the subscriber is permitted to gain access to the network and content resources consistent with rules pertaining to the subscriber's identity.

The authentication logic used in the authentication process is dependent on the protocol being used to perform the process. Any of multiple protocols may be used, each with advantages and disadvantages. In general, a more secure authentication process is accompanied by more computational overhead. For example, Point-to-Point Protocol (PPP) provides security and requires all subsequent packets to be encapsulated and de-encapsulated. HTTP basic authentication offers security in which a challenge and reply are encoded but not encrypted. Hence, in at least some cases, it is trivial for user IDs and passwords that are passed between the end station and the authentication process to be decoded by third-parties with access to intermediate links. Secure Socket Layer (SSL) protocol provides encryption facilities to protect the authentication process, which may produce delays and computational overhead resulting from the negotiation of the encryption and decryption process.

The third entity that is used in performing authentication is a storage entity for subscriber identities and credentials. In order for a subscriber to be authenticated, the subscriber identity and credentials are stored accessibly so that regardless of where a subscriber logs on to the network, appropriate rules bind the subscriber. In some implementations of authentication servers, such as RADIUS servers, the storage of subscriber identity information is co-located with the server providing the authentication process, which may complicate subscriber configuration management. For instance, a subscriber's identity may be bound not only to authentication credentials, but also to access rights, connection time restrictions, service levels and other subscriber specific information. Therefore, in at least some cases, it is advantageous to provide a single repository (e.g., DOE 80) for much or all such information.

Service Providers rely on an ability to configure the network used by their subscribers such that access to specific content can be restricted, limited, permitted, or enhanced. In at least some cases, Providers generate more revenue by giving subscribers access to specific, filtered content rather than basic access to the Internet. A subscriber can select specific content of interest instead of receiving and paying for access to content of little or no interest. It is also desirable for a subscriber's rules and attributes to be mobile, so that the rules and attributes follow if the subscriber travels to a new physical location.

Any of several methods may be used to configure the network devices to enforce such rules and attributes. According to a first method, each specific network device may maintain a configuration that resides in its local memory, which imposes memory bounds on the hardware. In at least some cases, such an arrangement is impractical, particularly where several network devices use the same configuration, which is replicated by network administrators. In addition, in such cases, subscriber mobility resources are provided for every subscriber and are replicated across all network devices. Synchronization is affected, since one network device's configuration may not match that of another network device. Also, as content is ever changing (for example, a movie information server could offer access to one server on Tuesday, and another server on Wednesday), it is possible, as a result, for rules to be updated frequently, e.g., several hundred times per day. For at least these reasons, such an arrangement also presents scaling difficulties.

A second method is similar to the first method, but allows configurations from a network device to be saved and then manually uploaded by a network administrator to other network devices. Thus, manual intervention is undertaken on each device. The circumstances of the subscriber mobility resources remain as in the first method, which produces large configuration files on each network device.

In a third method, a centralized configuration is provided and made available to all network devices for downloading, which reduces the number of individual configurations to one. The network device downloads (and devotes memory resources to) rules that may apply to a subscriber that may not be passing traffic through the device's part of the network, which can lead to inefficient use of resources, especially if large numbers of such rules are downloaded.

According to a fourth method, described in more detail below, the configuration information is stored in a repository (e.g., DOE 80) to which the network devices point upon startup and then download only necessary data. A set of rules is matched to one or more references, such as a subscriber's identity or a URL.

In a first embodiment, a Directory Server is used as the repository (DOE 80) for configuration information and provides the ability to store large amounts of information regarding subscribers, content, and rules such that switches can read the information efficiently and provide services that subscribers are requesting from Providers. (In another embodiment described below, DOE 80 has relational database aspects.) Productive results are achieved by organizing the Directory Server's directory structure effectively and placing objects in advantageous locations within the directory structure, as described below.

The Directory Server manages bindings between a subscriber, and the rules and attributes pertinent to the subscriber's effective use of the network. The Directory Server offers key features that facilitate the management of this information. First, the Directory Server has a hierarchical nature that allows for convenient organization of people into communities, such as companies, housing developments, or family units. Second, the Directory Server has access control mechanisms, which feature provides organizations with a flexible means for configuring and managing portions of a directory tree. This access control mechanism is used to determine which subscribers have access to which profiles as well as to control the modification of profiles. Third, the Directory Server is easily extensible. Accordingly, structures that are used specifically for managing network oriented information can be integrated into existing generic directories, such as computerized white pages, that already have people (including subscribers) defined. Also, generic directory structure definitions are increasingly becoming standardized, thus facilitating both interoperability and deployment.

Rules, referred to as Network Policies, are stored in the Directory Server in common sets of rules referred to as Policy Groups. A Network Policy is an abstraction of an Application Service. Application Services separate out the various elements of a policy, such as the time the policy is valid and the QoS applied to the application. This is done to allow a specific element such as the valid times to be reused across multiple Application Services. A Network Policy is the logical concatenation of these elements. A billable content resource manager called a Service Bundle contains Application Services.

Application Services may share common elements. For example, two separate Application Services may relate to the same specific content. Accordingly, Application Services are divided into smaller components, Service Elements, that can be shared among several Application Services. Service Elements include logically grouped characteristics. In a specific implementation of the present invention, five Service Elements are provided: Activation Period, Class of Service, Application, Network Address, and Flow Direction. New Service Elements may be added if necessary or helpful.

1) Activation Period element: It governs when an Application Service is active, and specifies appropriate characteristics, such as time of day, absolute start and stop times, or recurring time ranges.
2) Class of Service element: It determines the quality of service and differentiated services that are used by an Application Service.
3) Application element: It includes characteristics that uniquely identify the content to which the Application Service pertains, e.g., a URL, an IP address, a protocol, or a port.
4) Network Address element: It includes characteristics to uniquely identify a subscriber, e.g., a URL or an IP address.
5) Flow Direction Service Element: This is a collection of attributes that govern the Flow Direction in which the policy is enforced. With regard to the Flow Direction Service Element, there are three different Flow Directions provided: Inbound, Outbound, and Bi-Directional. Application Services that use the Outbound Flow Direction handle a flow of data from the subscriber to the content (for example, an HTTP GET message). Application Services that use the Inbound Flow Direction handle a flow of data from the content to the subscriber (for example, an HTTP response). Bi-Directional Flow-based Application Services handle data traveling in both directions, to and from the subscriber.

Figure 7:
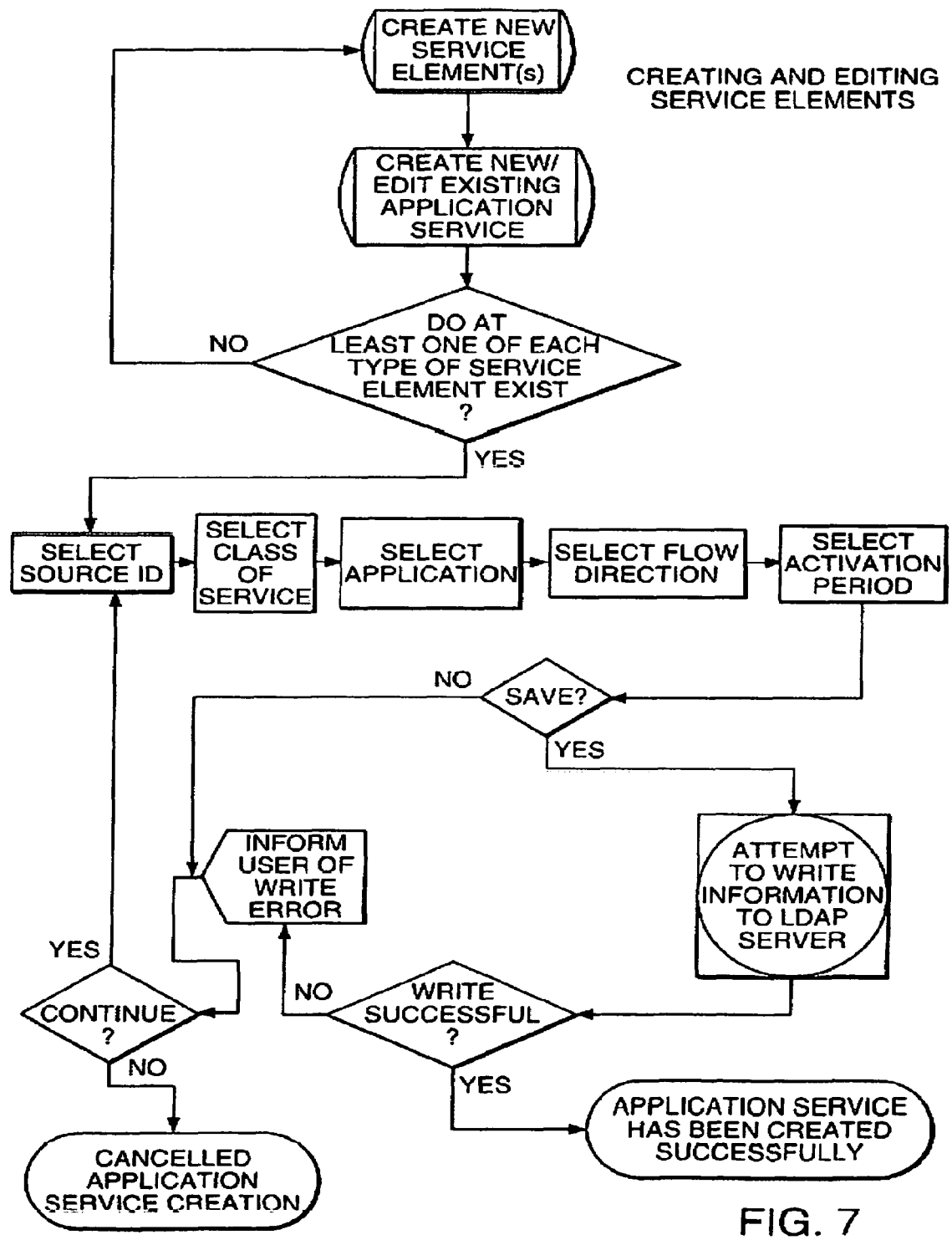
FIG. 7 is a flow chart illustrating a procedure for creating and editing service elements according to various embodiments of the present invention.
Figure 8:
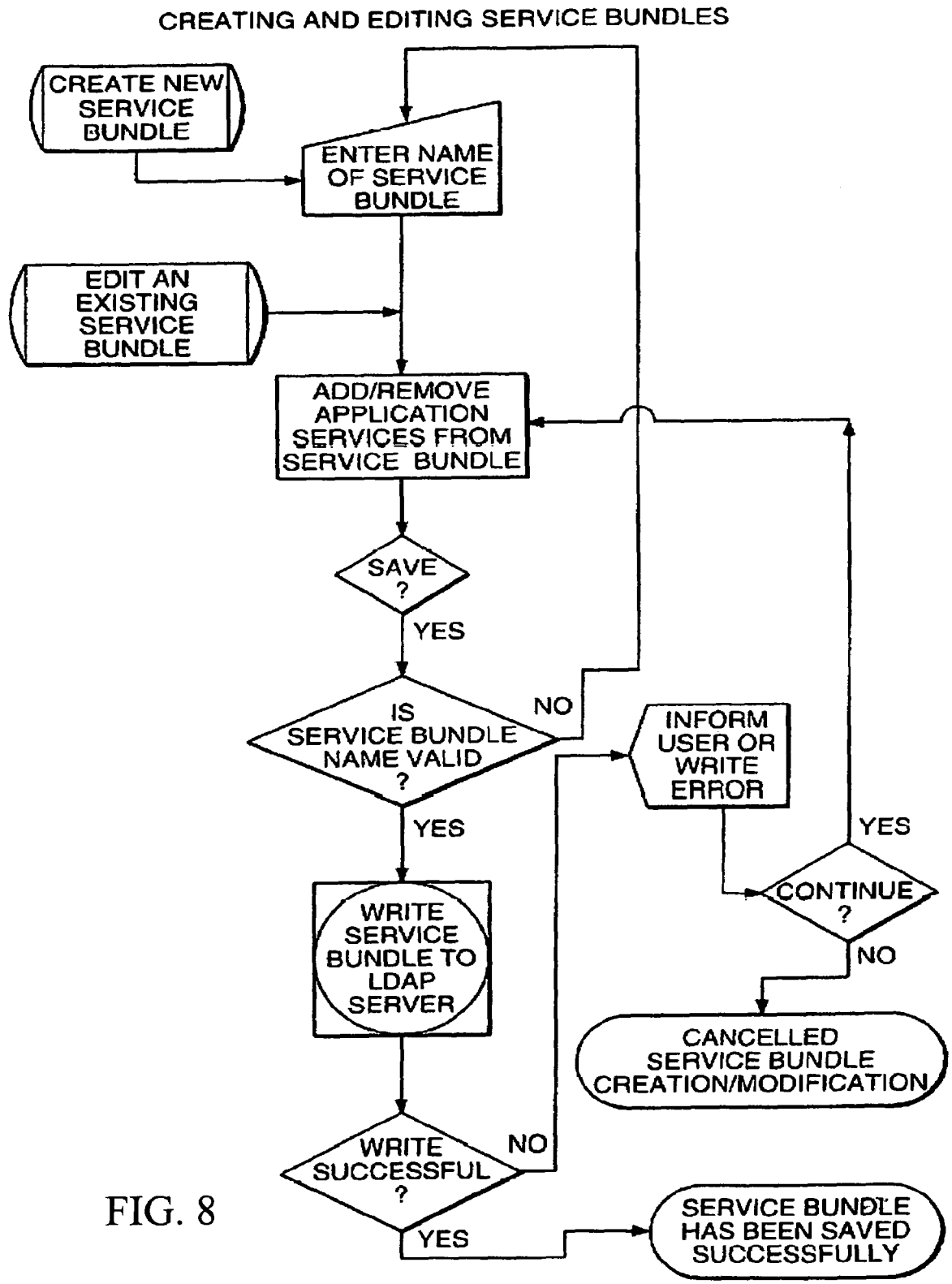
FIG. 8 is a flow chart illustrating a procedure for creating and editing service bundles according to various embodiments of the present invention.

Referring to FIG. 7, a valid Application Service relies on at least one of each of the different types of Service Elements. Once one of each of the Service Elements is selected, the Application Service is created. Now referring to FIG. 8, when an Application Service is added into a Service Bundle, all of the characteristics of the Service Elements that make up the Application Service are combined into the more complex Network Policy form, and the Network Policy is added into the Policy Group corresponding to the Service Bundle to which the Application Service was added. A purpose of the Network Policy is to reduce or minimize the number of queries required for switch 20 to retrieve policies from the directory. Alternatively, if switch 20 uses a direct interface to the switch services bean 166 (such as HTTP or COPS), the need to maintain the parallel network policy structure is reduced or eliminated.

Application Services that are in a Service Bundle are prioritized according to the order of the Application Services in the Service Bundle. If Application Services are reprioritized within the Service Bundle, the corresponding Network Policies are reprioritized within the corresponding Policy Group.

Figure 9B:
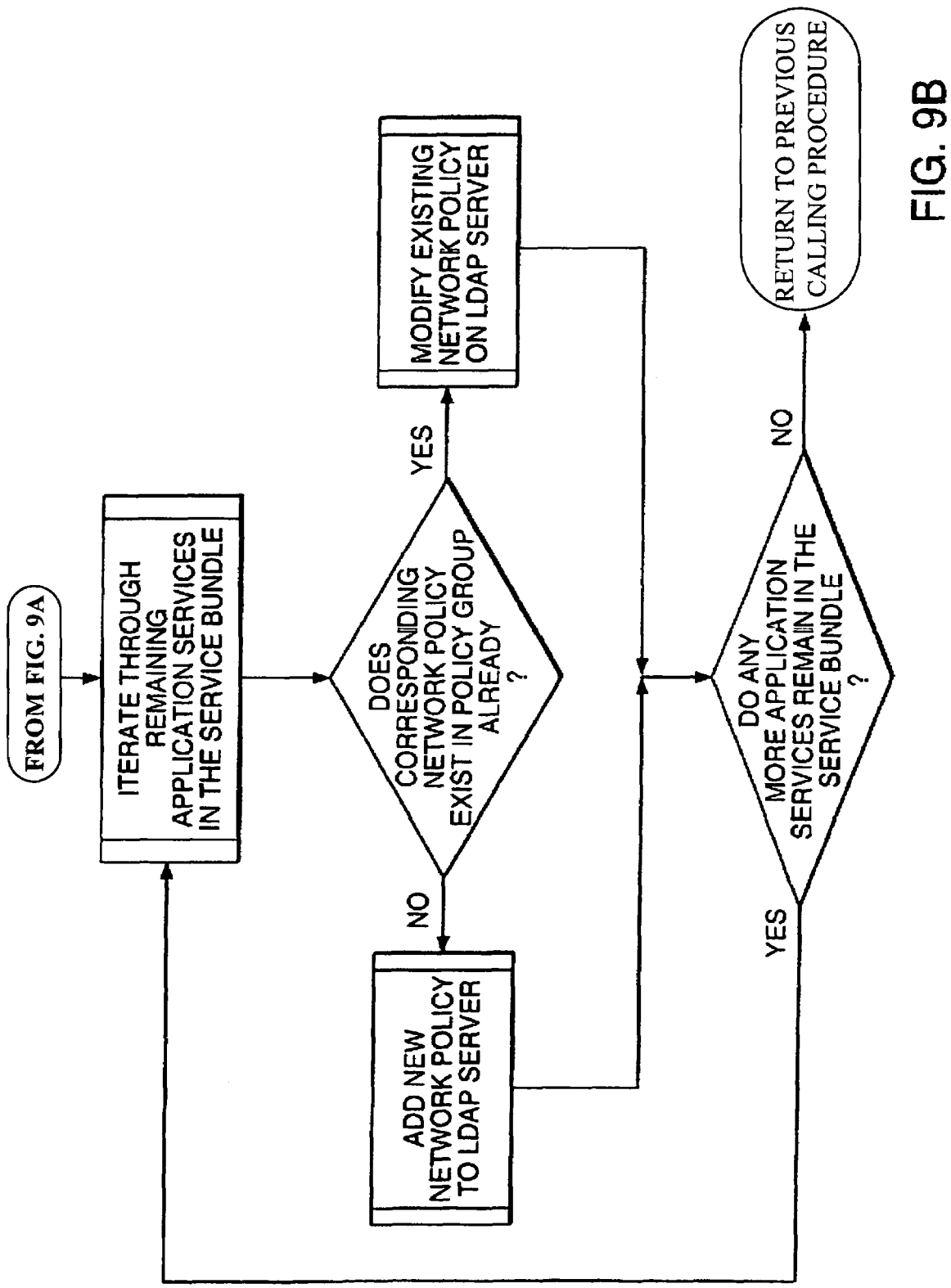
FIG. 9B is the second part of a flow chart illustrating a procedure for synchronizing service bundles and network policies according to various embodiments of the present invention.

Referring to FIG. 9, if Application Services are removed from the Service Bundle, the corresponding Network Policies are removed from the corresponding Policy Group and the priorities are adjusted accordingly.

If an Application Service is deleted from the Directory Server, which Application Service is listed in one or more Service Bundles, the parent Service Bundles remove the Application Service from their lists (and therefore remove the corresponding Network Policies, and adjust priorities accordingly).

If an existing Application Service is modified, meaning one or more of service element selections in that application service is changed, corresponding underlying Network Policies are updated accordingly. In a specific implementation of the present invention, Service Elements that are used in Application Services cannot be removed from the Directory Server, because a Service Element is a required member of an Application Service, and a replacement Service Element must be chosen before removal can occur. If a Service Element that is used in an Application Service is modified, underlying policies that were created using the Service Element's characteristics are also updated accordingly.

Subscribers are bound to zero or more Service Bundles. Subscribers can also be logically grouped into Subscriber Groups, which can also be bound to zero or more Service Bundles. Any subscriber that resides within a Subscriber Group automatically gets access to the Service Bundles from that Subscriber Group, which significantly reduces the amount of work required by a Network Administrator. For example, if a Subscriber Group contains several thousand subscribers, the Administrator applies Service Bundles to only one location, rather than executing several thousand individual operations.

Subscriber Group Service Bundles operate according to the following rules that help to keep access rules powerful, but simple:

1. A subscriber's local Service Bundles have a higher priority than Subscriber Group Service Bundles.

2. Subscriber Group Service Bundles are not reprioritized for, or removed from, an individual subscriber.

3. Subscribers can only be in a single Subscriber Group.

4. A subscriber can only use Subscriber Group Service Bundles from the Subscriber Group to which the subscriber belongs.

Service Bundles can be applied at either the subscriber or the Subscriber Group level.

Service Bundles that are applied at the subscriber level are stored with the subscriber's other information on the Directory Server. Service Bundles that are applied on a Subscriber Group level are stored with the Subscriber Group (and optionally all Subscriber Groups hierarchically represented in and under that Subscriber Group, recursively).

Service Bundles can be reprioritized or removed from any level of Subscriber Group, which allows a parent Subscriber Group to have one set of Service Bundles while a child Subscriber Group has a completely different set of Service Bundles. In the following example, in a model of a city building with a hacker center on one floor and companies on all other floors, the hierarchical reuse of Service Bundles can be ignored to allow specific overrides for certain Subscriber Groups.

Currently available Service Bundles are:
1. All building Access
2. All Internet Access
3. Third Floor Only
4. Company 1 Service The Subscriber Group Structure on the Directory Server may be:
- Building (has bundles "All Building Access" and "All Internet Access"
  - First Floor (acquires Building Bundles from Building level)
    ○ Company 1 (acquires bundles from First Floor, adds "Company 1 Service")
      ■ Company1Employee
  - Second Floor (acquires bundles from Building)
    ○ Company 2 (acquires bundles from Second Floor)
      ■ Company2employee
  - Third Floor
    ○ Hacker Group—(ignores Building bundles, only allows "Third Floor Access" bundle)
      ■ hacker1
      ■ hacker2

Noting the foregoing, the bundle assignment at the Subscriber Group is as follows, in order of bundle priority (based on the rules defined above):
1. Company 1—Company 1 Service, All building Access, All Internet Access
2. Company 2—All building Access, All Internet Access
3. Hacker Group—Third Floor Access Subscribers are automatically given the Service Bundles of their respective Subscriber Groups. For example, "hacker2" shown in the example above, has the Service Bundles from the "Third Floor Access" bundle.

Additional Service Bundles can be added that have a higher priority than the preexisting Subscriber Group Service Bundles, hence, overriding the effects of the other Subscriber Group Service Bundles. For example, if a new subscriber "Hall Monitor" is added to the HackerGroup and is to be given Internet access, the All Internet Access ServiceBundle is added to Hall Monitor's list, as follows:

All Internet Access, Third Floor Access.

Thus, subscriber "Hall Monitor" is given Internet access outside the third floor, while the lack of Internet access is retained for the rest of the subscribers in the Subscriber Group (the other hackers).

Figure 10:
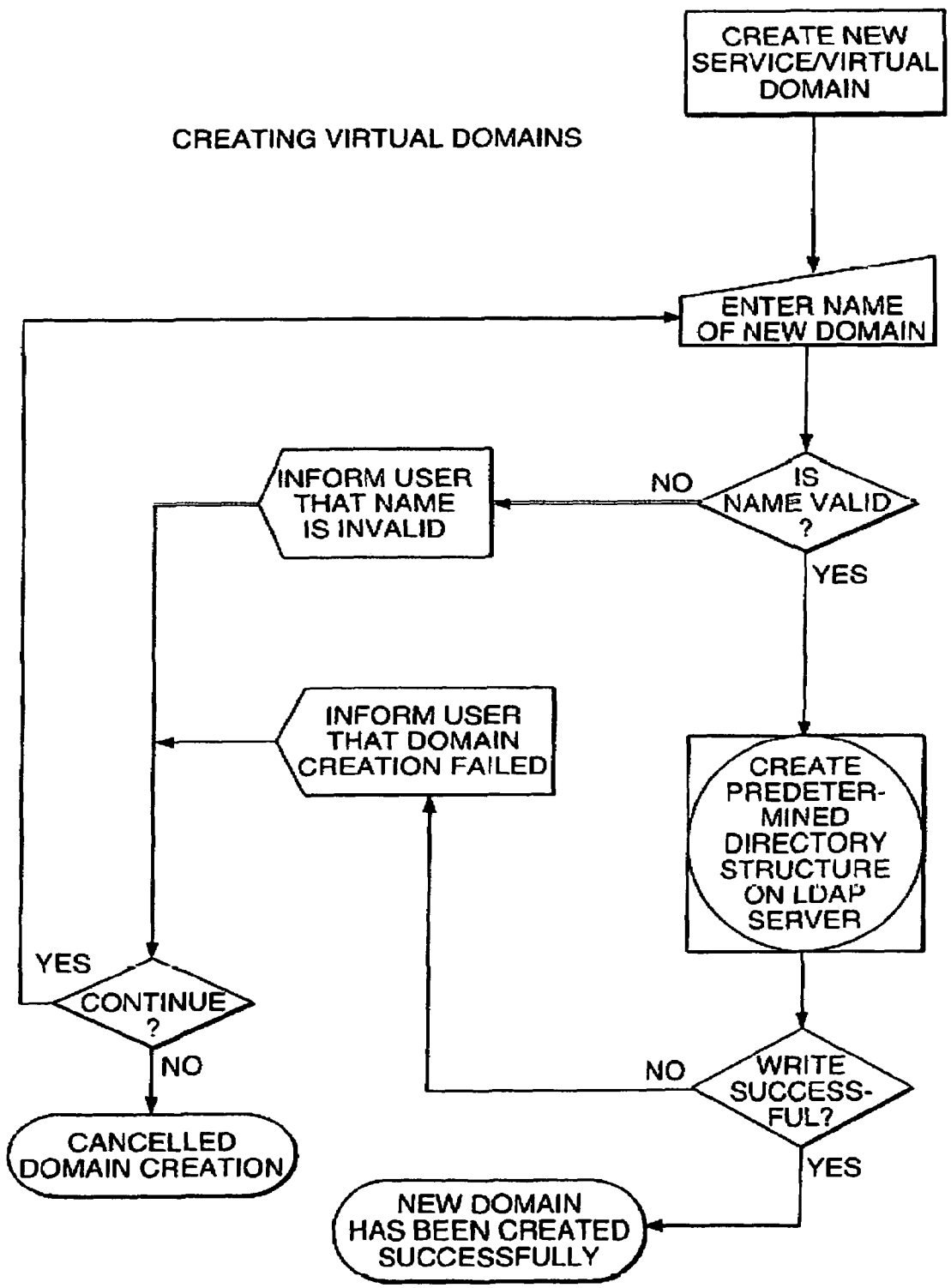
FIG. 10 is a flow chart illustrating a procedure for creating virtual domains according to various embodiments of the present invention.
Figure 11:
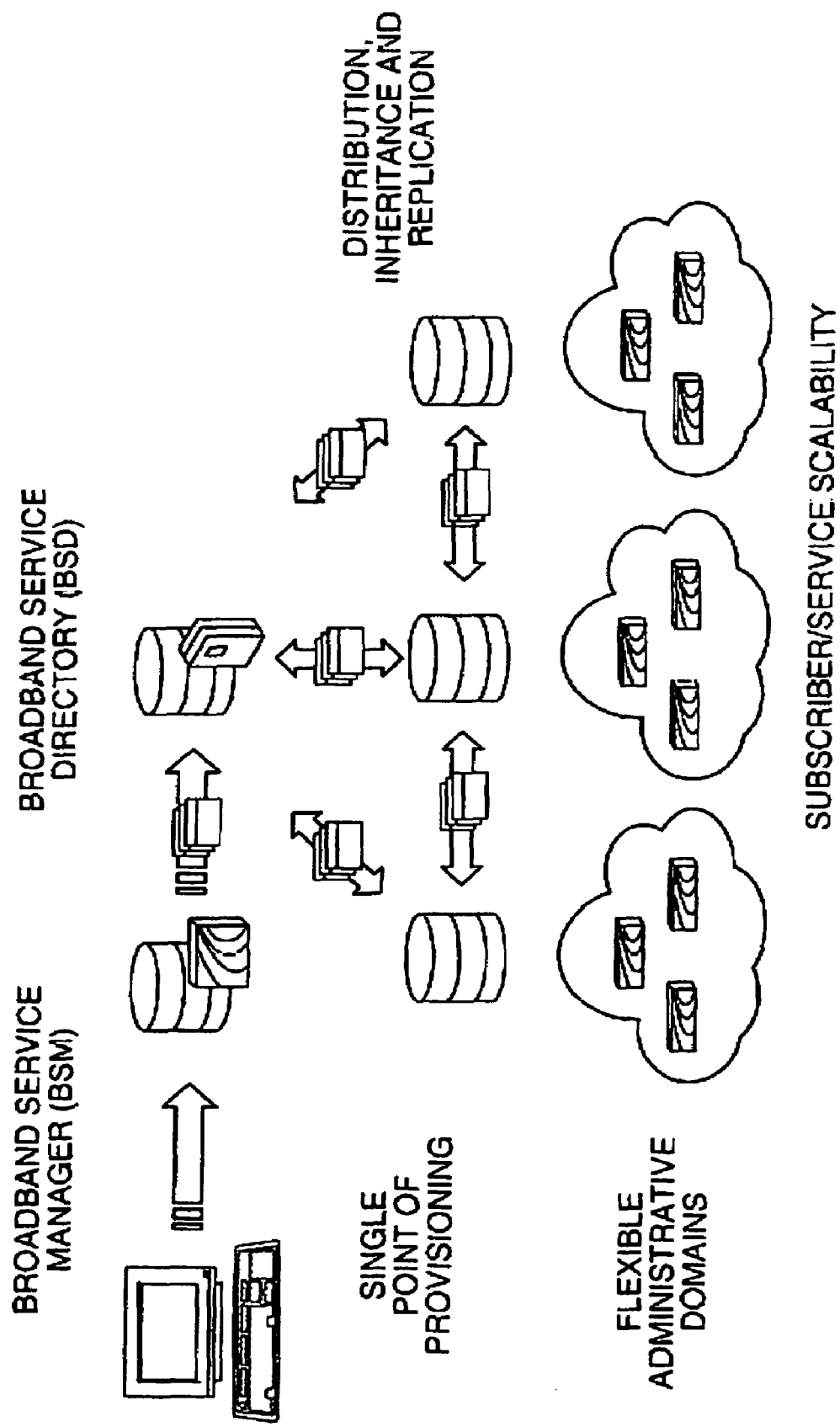
FIG. 11 is a diagram a illustrating a directory structure included in a Directory Server according to various embodiments of the present invention.

With reference to FIG. 11, a directory structure included in the Directory Server provides a Service Domain that serves to organize and group like objects on the Directory Server to facilitate manipulation by subscribers and access by the Switch. A Service Domain includes a basic directory hierarchy and an assortment of default objects which are placed into the service domain upon successful creation according to the method shown in FIG. 10.

In a specific implementation of the present invention, the Directory Structure has the following structure which is supported by Table 1 of FIG. 12:
- Service Domain
  ○ Application Services
  ○ Configurations
    ■ Switches
    ■ Switch Configurations
    ■ Policy Configurations
  ○ Network Devices
  ○ Network Policies
    ■ Default

- People
- Service Bundles
- Service Elements
  - Activation Periods
  - Class of Service
  - Flow Directions
  - Applications
  - Sources Within a Service Domain, special subscriber entries are created for subscribers that require additional access to the special subscribers' (or another) Service Domain. For example, the special subscribers may include local administrators who need to add new subscribers and others who are qualified to make Service Domain-wide decisions.

Directory Servers provide the ability to set up different categories of administrative groups, assign specific permissions to each of the groups, and then add or remove subscribers from those administrative groups. Subscribers who are in an Administrative Group are given the permissions of the Administrative Group for the Service Domain. Subscribers from other Service Domains can be placed in an Administrative Group in another Service Domain, thereby giving such subscribers control over a different Service Domain.

According to the present invention, there are three categories of administrative groups provided:

1) Domain Administrator—Subscribers in this group have complete control or nearly complete control over the Service Domain in which the Administrative Group resides. Such control includes the ability to add, modify, and remove any item in the Service Domain. Administrators are considered subscribers despite not necessarily being consumers of content resources.

2) Domain Modification—Subscribers in this group have the ability to modify existing items in the Service Domain in which the Administrative Group resides, but cannot add new items to the server or remove existing items from the server. The subscribers can add and remove Application Services to and from an existing Service Bundle, but cannot create new Service Bundles or new Application Services.

3) Subscriber Administrator—Subscribers in this group have complete control or nearly complete control over the subscriber branch of the Service Domain in which the administrative group resides. Such subscribers can create entries for new subscribers, modify and delete existing subscriber entries, and assign a restricted set of Service Bundles to a specific subset of subscribers.

As noted above, in a second embodiment, DOE 80 has relational database aspects, which may provide advantages for at least two reasons as now discussed in summary form and in more detail below. First, in the first embodiment described above, the direct connection between switch 20 and DOE 80 can present architectural challenges in at least some cases. Second, the flexibility of the Directory Server is a result of its hierarchical nature that can make the maintenance of relations challenging to maintain, especially in complex cases.

The second embodiment can be derived from the first embodiment as follows:

In a first phase, the transport for retrieving switch policies is changed from DOE 80 to service integration engine 60. Second, a new policy data model (schema) is defined that addresses schema specific issues. Finally, LDAP based data structures transported between switch 20 and service integration engine 60 are replaced with data structures that take advantage of the new policy schema and leverage a direct transport interface between switch 20 and service integration engine 60.

With respect to the first embodiment and the direct connection dependence of switch 20 on DOE 80, multiple challenging issues may arise. In a first issue, the directory is used as a message passing service between switch 20 and service integration engine 60. The directory of the first embodiment may rely on a premise that modifications occur infrequently, which may lead to scaling difficulties in the case of frequent writes and other modifications. In addition, message passing presumes that when one side makes a change to the directory, the other side notices the change. The first embodiment relies on polling for directory changes which can result in significant overhead as well as delays. Further, in some cases the directory is used to effect changes in all the switches simultaneously, without feedback, which renders difficult or impossible the task of determining when all the switches have been updated.

The first embodiment has features relating to limitations in representing transactional semantics. In some cases, it is important to determine not only that the other side has received the message, but also that the other side has acted upon the message, in both directions. In some cases, switch 20 relies on information indicating that service integration engine 60 is aware of a new subscriber and when the subscriber has been authenticated. In other cases, service integration engine 60 relies on information indicating that a policy for a specific subscriber is or is not in effect (i.e., usage information). More complex scenarios are possible in which a policy set up by service integration engine 60 subsequently requests statistics or modifications to the rate, or even dynamic changes to the rates of a broad set of policies, due to changes in the network topology.

In the case, for example, of a Netscape based directory, multiple Directory Servers can be redundant and replicated from which data may be read, but only one (prior to Netscape 5.0) or two (Netscape 5.0 or later) Servers support modifications to the directory, which causes all messaging to be written to such one or two Servers. Thus, a scaling issue is presented regarding the number of writes that can take place and the ability of the Servers to support the writes. Further, since many Directory Servers are provided from which data can be retrieved and only one or two Directory Servers allow data to be modified, time is needed to allow updates to propagate to all the read-only servers. Such a need for time can add delays and make immediate use of modified data difficult or impossible, particularly when the same client is writing and then reading the same directory entry.

In the first embodiment additional aspects relate to maintaining the consistency of various directory entries that are dependent or related to each other. For example, the Service Bundles maintain lists of applications. If an application is removed, corresponding references must be removed from all of the Service Bundles as well. Even if a reference to the application is removed from the Service Bundles in the directory before the application is removed, it remains possible for another client or process to read a stale version of the Service Bundle that still has a reference to the application, without being able to find the corresponding application entry. Because many directory entries reference other directory entries, the burden of maintaining consistency and discovering and handling timing inconsistencies can fall on client software. As the complexity of the Directory increases with new structures and additional references, the software complexity and maintenance costs increase proportionally or even geometrically.

With respect to flexibility aspects in the first embodiment, applications are defined to support many configuration aspects (e.g., Time of Day, QoS, Tunneling) independently and in combination to minimize the number of times specific information needs to be specified. If multiple applications are enabled under the same time constraints, a change of a single Time of Day structure can affect all of the applications sharing that structure, thus reducing overhead associated with configuration changes. Accordingly, many different types of data structures are maintained independently and are bound to each other using references. The more flexibility, the more references, and hence the more potential issues with referential integrity. Further, the flexibility also affects the complexity of transactions. For example, to represent all of the semantics of an application policy, the schema relies on the consolidation of a large number of independent structures. However, unlike a directory that relies on at least one query per component of an application and the subsequent consolidation of the information on the client, a database can retrieve and consolidate all of the application's attributes in response to a single query. In the first embodiment, all of the application parameters may be consolidated into a single policy entry to make queries more efficient, but duplication of information is thereby produced in the directory and additional complexity is introduced in checking to ensure that the consolidated entry is consistent with its constituent elements. Such issues may be exacerbated and additional issues may arise with the introduction of new features that add complexity to the data model.

With respect to the complexity of the schema in the second embodiment, it is appropriate to use a relational data management model (e.g., a relational database or a directory having relational database aspects) in order to provide suitable scaling, performance, reliability, and timeliness to implement capabilities. In a specific implementation, some or all of the directory schema is implemented by a relational database. For an existing system, since switch 20 is dependent on the directory for a substantial amount of communication and changes to the schema directly affect switch 20, switch 20 communicates directly with the switch services bean 166 in the second embodiment.

The second embodiment eliminates or nearly eliminates scenarios that cause DOE 80 to serve as a message passing system, by modifying switch 20 software in two ways. First, switch 20 communicates data requests through service integration engine 60 rather than directly to DOE 80. Second, as noted above, the underlying transport changes from LDAP to a different protocol. Since switch 20 communicates through service integration engine 60, a protocol is used that is particularly suitable for such a communication path, by offering transactional, reliable, and fault-tolerant semantics at the transport layer.

In addition, the second embodiment defines a new schema specifically optimized for service integration engine 60. The schema meets the evolving needs of engine 60 while providing backward compatibility for features of the original data model.

With respect to the interface between switch 20 and service integration engine 60 and the accompanying schema, a transactional schema is used in place of the LDAP schema. The transactional schema provides dynamic policy deployment and is suitable in the event of emergence of standards for installing service policies in access switches.

One or more of the following technologies may be used in the transports between switch 20 and service integration engine 60: HTTP, Simple Network Management Protocol (SNMP), COPS, and CORBA. In at least some cases, it is advantageous to use COPS, which may meet the largest set of needs discussed previously. Further, it may be advantageous to use a binary encoding strategy due to the high usage of the interface and the performance costs associated with textual encodings, which are also supported by COPS. Conversely, if HTTP is used and it is later determined that binary encodings are useful or necessary, another set of migration issues may arise. In addition, by using COPS, service integration engine 60 can support third party switches that rely on COPS to manage subscribers and services.

The technique (including one or more of the procedures described above) may be implemented in hardware or software, or a combination of both. In at least some cases, it is advantageous if the technique is implemented in computer programs executing on one or more programmable computers, such as a computer running or able to run Microsoft Windows 95, 98, 2000, Millennium Edition, NT; Unix; Linux; or MacOS; that each include a processor such as an Intel Pentium 4, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C, C++, Java, or Perl to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, DOE 80 may include a front end to an existing Directory Server, with the front end translating requests from service integration engine 60. A portal page may be generated for display on a personal digital assistant (PDA) or may be generated in a form that is suitable for non-visual (e.g., voice-activated) interaction with the subscriber.

The terms and expressions that are employed herein are terms of description and not of limitation. There is no intention in the use of such terms and expressions of excluding the equivalents of the features shown or described, or portions thereof, it being recognized that various modifications are possible within the scope of the present invention as described and claimed.

What is claimed is:

1. A method for managing content resources in a network, comprising:

receiving a subscription request from a user, the subscription request specifying at least one user specific content resource to be presented to the user through the network;

determining that the user is authorized for access to the at least one content resource by use of the user's Internet Protocol (IP) address;

determining at least one network resource requirement required for presenting the at least one user specific content resource to the user responsive to user specific content rules and the subscription request; and providing, for the user at least one network resource in the network to transmit the user specific content resource based on the determined at least one network resource requirement and the user specific content rules to satisfy the subscription request.

2. The method of claim 1, wherein determining that the user is authorized for access comprises configuring a switch, to determine whether the user is an authorized user by use of the user's IP address.

3. The method of claim 1, further comprising:

generating a user specific portal Web page reflecting the user's subscription request; and presenting the user specific portal Web page to the user, wherein the user specific portal Web page comprises at least one link to the at least one user specific content resource.

4. The method of claim 3, wherein the user specific portal Web page allows the user to make a subscription change.

5. The method of claim 3, wherein the user specific portal Web page allows the user to change appearance of the at least one user specific content resource when the at least one user specific content resource is presented to the user.

6. The method of claim 3, wherein the user specific portal Web page displays to the user services to which the user can optionally subscribe.

7. The method of claim 3, wherein the user specific portal Web page provides to the user a captive portal environment.

8. The method of claim 3, further comprising creating a service bundle comprising a collection of content resources grouped together, wherein the user specific portal Web page allows the user to subscribe to the service bundle.

9. The method of claim 8, wherein the service bundle comprises content resources provided by a particular content provider.

10. The method of claim 8, wherein the service bundle comprises content resources paid for with a single monthly fee.

11. The method of claim 8, further comprising:

providing to an application service provider a Web-based interface that allows the application service provider to dynamically create application services comprising content resources; and adding the created application services to the service bundle.

12. The method of claim 8, further comprising:

automatically associating the user to the service bundle if the user belongs to a pre-specified subscriber group.

13. The method of claim 1, further comprising by a switch, blocking access by another user to the at least one user specific content resource based on authorization information residing external to the switch.

14. The method according to claim 1, wherein the subscription request specifies at least one activation period for presenting the at least one user specific content resource to the user; and wherein providing the network resource to transmit the user specific content resource comprises providing the network resource to transmit the user specific content resource during the specified at least one activation period.

15. The method according to claim 1, wherein determining the at least one network resource requirement comprises determining a bandwidth required for presenting the user specific content resource to the user.

16. The method according to claim 1, wherein determining the at least one network resource requirement comprises determining an amount of delay that can be tolerated for presenting the user specific content resource to the user.

17. The method according to claim 1, wherein the providing comprises configuring a switch in the network.

18. The method of claim 1, further comprising calculating fees to be paid by the user for subscription of content resources.

19. The method of claim 1, further comprising sending one or more advertisements to the user.

20. The method of claim 19 wherein the one or more advertisements are targeted to appeal to the user based on the user's subscriptions of content resources.

* * * * *